(12) United States Patent  
Hirako

(10) Patent No.: US 7,039,730 B2  
(45) Date of Patent: May 2, 2006

(54) STORAGE DEVICE CONTROL APPARATUS AND METHOD

(75) Inventor: Norio Hirako, Hadano (JP)

(73) Assignee: Hitachi, Ltd., Tokyo (JP)

( * ) Notice: Subject to any disclaimer, the term of this patent is extended or adjusted under 35 U.S.C. 154(b) by 260 days.

(21) Appl. No.: 10/765,109

(22) Filed: Jan. 28, 2004

(65) Prior Publication Data

US 2005/0120169 A1    Jun. 2, 2005

(30) Foreign Application Priority Data

Dec. 2, 2003    (JP) .............................. 2003-402996

(51) Int. Cl.
   *G06F 13/14*    (2006.01)
(52) U.S. Cl. .............................. 710/36; 710/74; 710/62
(58) Field of Classification Search .................. 710/36
   See application file for complete search history.

(56) References Cited

U.S. PATENT DOCUMENTS

| | | | |
|---|---|---|---|
| 5,535,345 A | * | 7/1996 | Fisch et al. .................. 710/305 |
| 6,219,738 B1 | | 4/2001 | Kondo et al. |
| 6,584,539 B1 | * | 6/2003 | James et al. .................. 710/314 |
| 2003/0065841 A1 | | 4/2003 | Pecone |
| 2004/0019713 A1 | | 1/2004 | Bissessur et al. |
| 2004/0205294 A1 | | 10/2004 | Nakayama et al. |
| 2004/0215878 A1 | | 10/2004 | Takata et al. |
| 2005/0050401 A1 | | 3/2005 | Matsuki et al. |

* cited by examiner

*Primary Examiner*—B. James Peikari  
(74) *Attorney, Agent, or Firm*—Mattingly, Stanger, Malur & Brundidge, P.C.

(57) ABSTRACT

A storage device controller includes a channel controller to receive a data input/output request sent from an information processor, a disk controller, and a cache memory. The channel controller includes a communication interface unit for the information processor, a data transfer unit connected via a first bus to the communication interface unit, and a processor connected via a second bus to the data transfer unit. The communication interface unit sends a read command to the data transfer unit for the processor. When the first bus conforms to a first communication protocol, the data transfer unit sends a split response to the communication interface unit. The data transfer unit sends the read command to the processor. The processor sends the split response and readout data corresponding to the read command to the data transfer unit. The data transfer unit receives and sends the readout data to the communication interface unit.

20 Claims, 20 Drawing Sheets

STORAGE DEVICE CONTROL APPARATUS AND METHOD

CROSS-REFERENCE TO RELATED APPLICATION

This application relates to and claims the priority from Japanese Patent Application No. 2003-402996, filed on Dec. 2, 2003, the entire disclosure of which is incorporated herein by reference.

BACKGROUND OF THE INVENTION

The present invention relates to a storage device control apparatus and a method of controlling the same.

In recent information processing apparatuses or processors, the amount of data to be processed is remarkably increasing. In this regard, larger storage capacity and a higher data processing speed are required for storage devices disposed externally with respect to the information processors to store and to control data.

SUMMARY OF THE INVENTION

In the situation described above, it is required to design a storage device to improve the data transfer rate while flexibly and positively incorporating new standards and specifications in the storage device.

It is therefore an object of the present invention, which has been devised to solve the problem, to provide a storage device control apparatus and a method of controlling the same by flexibly and positively incorporating new standards and specifications.

To achieve the object according to one aspect of the present invention, there is provided a storage device control apparatus including a channel controller for receiving a data input/output request sent from an information processor to a storage device, a disk controller for controlling data input/output operations for the storage device, and a cache memory for storing input/output data communicated between the channel controller and the disk controller. The channel controller includes a communication interface unit for communicating with the information processor, a data transfer unit connected via a first bus to the communication interface unit for transferring the input/output data communicated between the communication interface unit and the cache memory, and a processor connected via a second bus to the data transfer unit for controlling the data transfer unit. The communication interface unit transmits a read command to the data transfer unit, the read command indicating the processor to read data. The data transfer unit sends, when the first bus conforms to a first communication protocol, a split response to the communication interface unit and sends the read command to the processor, the split response indicating that readout data corresponding to the read command is transmitted later. The data transfer unit does not send, when the first bus conforms to a second communication protocol, the split response to the communication interface unit and sends the read command to the processor. The processor receives the read command, transmits the split response to the data transfer unit, and sends the readout data corresponding to the read command to the data transfer unit. The data transfer unit receives the readout data and sends the readout data to the communication interface unit.

According to the present invention, there are provided a storage device control apparatus and a method of controlling the same in which the data transfer rate is improved while flexibly and positively incorporating new standards and specifications.

Referring now to the drawings, description will be given in detail of an example of an embodiment according to the present invention.

DESCRIPTION OF THE EMBODIMENTS

Overall Storage System Configuration

Figure 1:
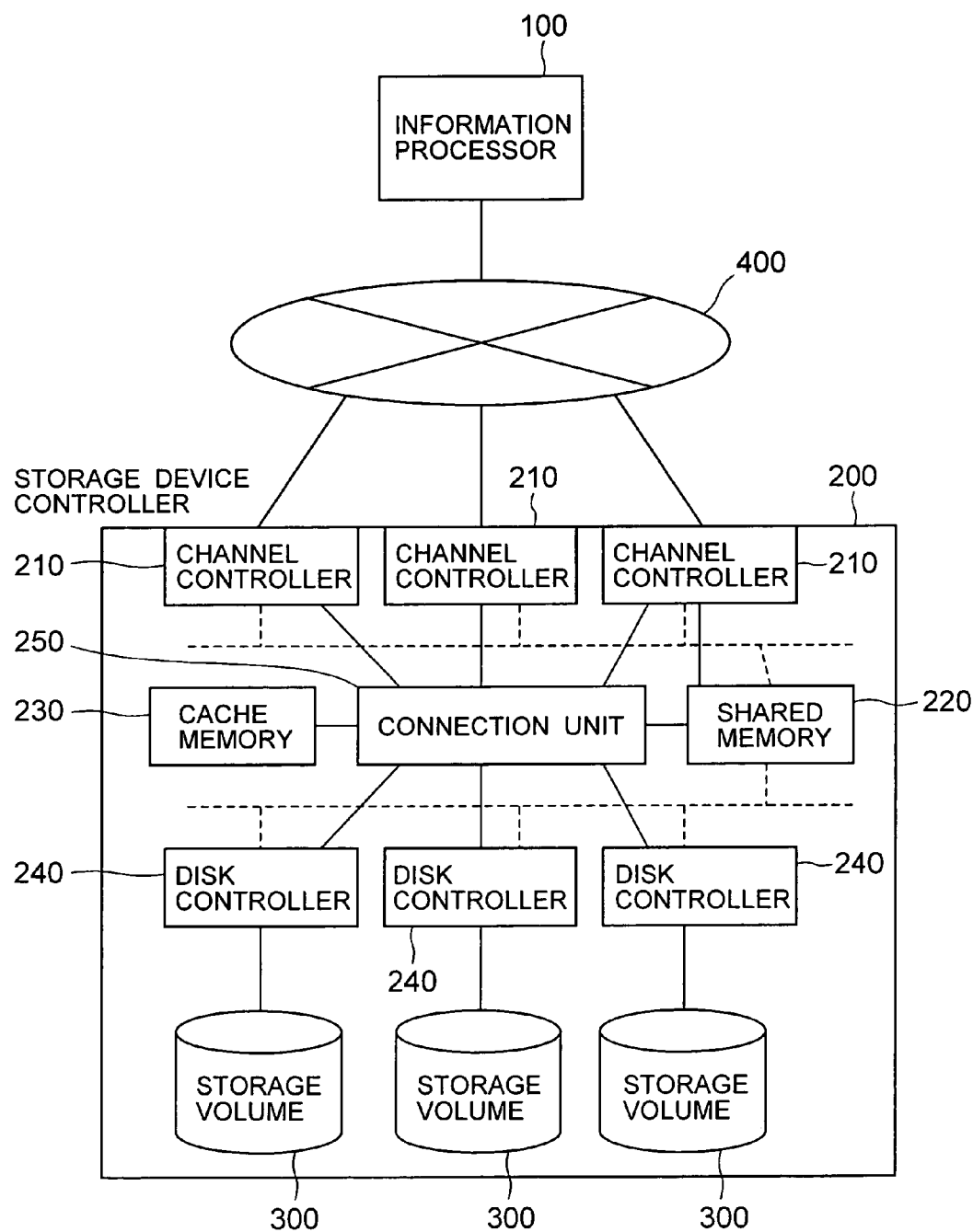
FIG. 1 is a block diagram showing an overall configuration of an embodiment of an information processing system according to the present invention.

FIG. 1 shows in a block diagram an overall configuration of an information processing system including a storage device control apparatus or controller 200 according to the present invention. As can be seen from FIG. 1, the storage system includes an information processing apparatus or processor 100 to provide various information processing services and a storage device controller 200 to provide storage areas of storage volumes 300 to the information processor 100.

The information processor 100 is a computer including a central processing unit (CPU) and a memory. In the information processor 100, the CPU executes various programs to achieve functions associated therewith. The information processor 100 may be, for example, a personal computer, a workstation, or a mainframe computer. The information processing system may include only one information processor 100 or a plurality of information processors 100. The information processor 100 executes an operating system, and various application programs are implemented under control of the operating system.

The information processor 100 is connected via a storage area network 400 to the storage device controller 200. The information processor 100 communicates with the storage device controller 200 via the storage area network 400 using a fiber channel protocol. The network 400 may serve as a communication route according to various protocols other than the fiber channel protocol. As the storage area network, there may be used, for example, a local area network (LAN), a small computer system interface (SCSI), an internet small computer system interface (iSCSI), enterprise system connection (ESCON; registered trademark), fiber connection (FICON; registered trademark), advanced connection architecture (ACONARC; registered trademark), and fiber connection architecture (FIBARC; registered trademark)). In the configuration, the information processor 100 may be directly connected to the device controller 200.

The information processor 100 sends a data input/output request to the storage device controller 200 according to the fiber channel protocol. Having received the request from the information processor 100, the storage device controller 200 executes input/output processing of data for a storage volume 300 in response to the request. By appropriately accessing storage areas of the storage volumes 300 as above, various application programs executed in the information processor 100 achieve associated functions.

The storage device controller 200 includes many physical disks to control storage areas of a plurality of storage volumes 300. A storage volume (storage device) 300 includes storage areas including a physical volume of a physical disk and a logical volume logically set on physical volumes. A physical disk may be, for example, a hard disk or a semiconductor memory. The storage device controller 200 may includes a disk array of a plurality of storage volumes 300 to provide storage areas under control of a redundant arrays of inexpensive disks (RAID). Or, the controller 200 may provide storage areas using only one single physical disk. The storage volume 300 may be configured integrally in the storage device controller 200 or may be a device independent of the storage device controller 200 to be connected via a communication route such as SCSI, LAN, or an storage area network (SAN) to the storage device controller 200.

The storage device controller 200 includes channel controllers 1 to 3 (210), a shared memory 220, a cache memory 230, disk controllers 1 to 3 (240), and a connection unit 250 as shown in FIG. 1.

The channel controller 210 includes a communication interface to communicate with the information processor 100 and a function to receive a data input/output request sent from the information processor to a storage device. Having received a data input/output request, the channel controller 210 determines necessary information items such as an address of an associated storage volume 300 and a data length according to the request and then creates an input/output (I/O) command to access the storage volume. As above, the storage device controller 200 provides storage areas of the storage volume 300 to the information processor 100. The input/output command includes information items such as a data start address, a data length, an operation type indicating a data reading or writing operation. For a data writing operation, the command may include write data to be written in the storage volume 300. The command is created by a microprocessor, which will be described later.

The connection unit 250 connects the channel controllers 210, the shared memory 220, the cache memory 230, and the disk controllers 240 to each other. The channel controllers 210, the shared memory 220, the cache memory 230, and the disk controllers 240 communicate data and commands with each other via the connection unit 250. The connection unit 250 may be, for example, a high-speed crossbar switch to conduct data transmission using high speed switching operations.

The shared memory 220 and the cache memory 230 are storage memories shared among the channel controllers 210 and the disk controllers 240. The shared memory 220 is primarily used to store control information and commands. The cache memory 230 is mainly used to store data. The channel controller 210 writes an input/output command in the shared memory 220, the command being created as above. The channel controller 210 writes in the cache memory 230 data associated with an input/output command, for example, write data of a write request command.

The disk controller 240 controls operations for a data input/output request issued to the associated storage volume 300. The disk controller 240 reads an input/output command from the shared memory 220 and controls, according to the command, operations for the input/output request of the command to the storage volume 300. The disk controller 240 converts a logical address specified in the command by the channel controller 210 into a physical address. If the physical disk of the physical volume 300 is disposed in a configuration of the redundant arrays of inexpensive disks (RAID), the disk controller 240 accesses the storage volume 300 according to the configuration, for example, RAID0, RAID1, or RAID5.

When the data input/output request received from the information processor 100 is, for example, a data read or readout request, the channel controller 210 makes a check to determine whether or not data specified by the data read request is present in the cache memory 230. If the data is present therein, the channel controller 210 sends the data to the information processor 100. Otherwise, the channel controller 210 writes the read command in the shared memory 220 and starts monitoring the shared memory 220. When the disk controller 240 detects an event that the read command is written in the shared memory 220, the disk controller 240 reads the target data from the storage volume 300, writes the data in the cache memory 230, and writes an event of the writing of the data in the shared memory 220. When the channel controller 210 detects an event that the target data is written in the cache memory 230, the channel controller 210 sends the data to the information processor 100.

In this way, data is communicated via the cache memory 230 between the channel controller 210 and the disk controller 240.

Channel Controller

Figure 2:
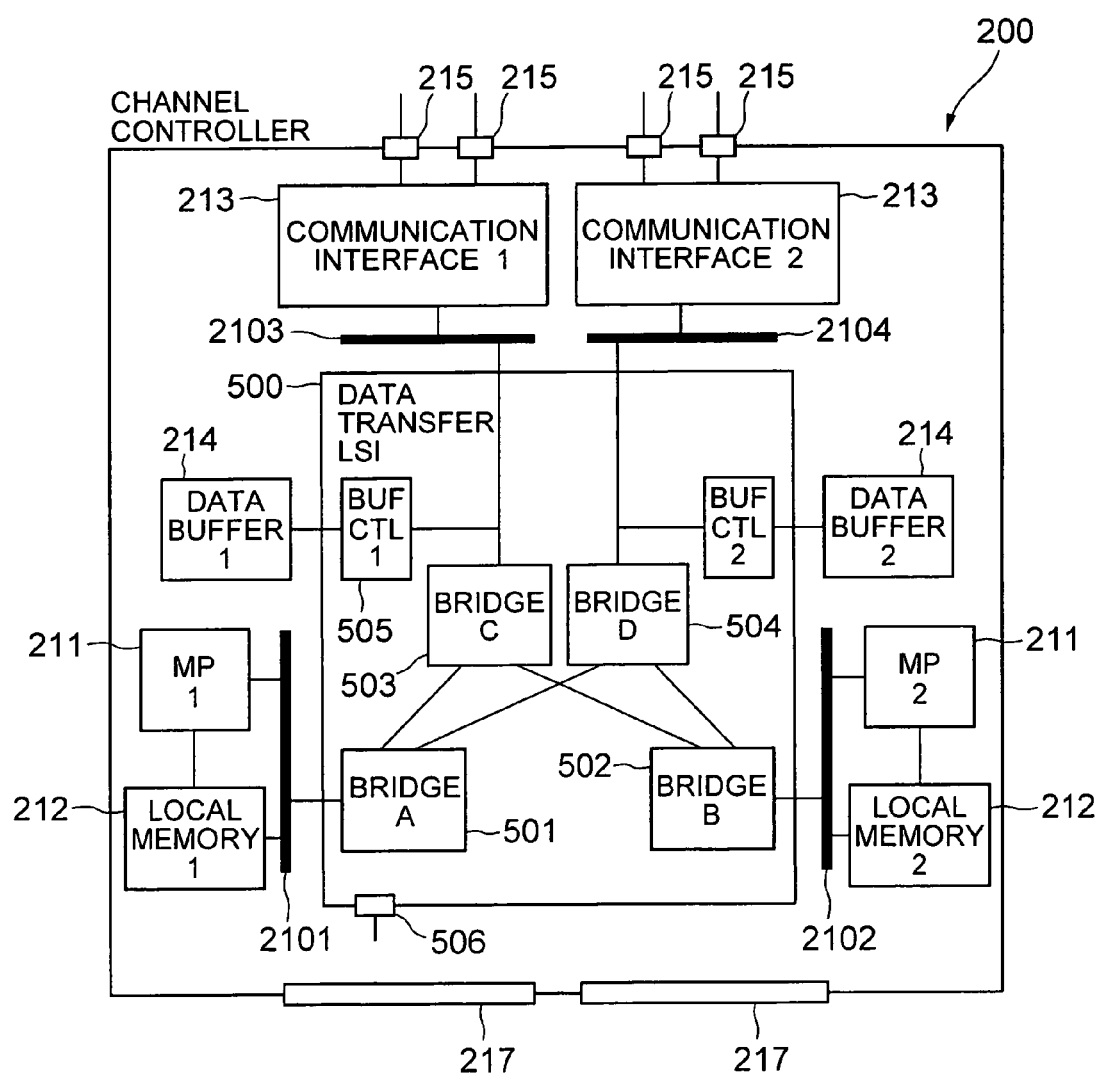
FIG. 2 is a diagram showing an internal configuration of a channel controller 210 of the embodiment.

FIG. 2 shows an internal configuration of the channel controller 210 in a block diagram.

The channel controller 210 includes microprocessors 1 and 2 (MP; first and second microprocessors), local memories 1 and 2 (212), communication interfaces (PRTCL) 1 and 2 (213; first and second communication interface units), data buffers 1 and 2 (214), communication connectors 215, and a data transfer large scale integration (LSI) block 500 (data transfer section).

The communication interface 1 (213) is connected via a bus 2103 (first bus) to the data transfer LSI block 500. The microprocessor 1 (211) is connected via a bus 2101 (second bus) to the data transfer LSI block 500.

The communication interface 2 (213) is connected via a bus 2104 (third bus) to the data transfer LSI block 500. The microprocessor 2 (211) is connected via a bus 2102 (fourth bus) to the data transfer LSI block 500. It is assumed in the embodiment that the buses 2101 and 2102 conform to the PCI-X standard and the buses 2103 and 2104 conform to the PCI standard.

The communication interface 213 includes an interface to communicate with the information processor 100. The communication connector 215 includes an interface to communicate with the information processor 100. In the channel controller 210 of the embodiment, the communication connector 215 is a connector which can be connected to a storage area network (SAN). The connector 215 corresponds to, for example, a fiber channel. If the channel controller 210 receives a data input/output request from the information processor 100 with a file name specified in the request, it is also possible that the communication connector corresponds to ethernet (registered trademark) such that the channel controller 210 receives the data input/output request via a local area network.

The microprocessors 211 control the overall operation of the channel controller 210. The microprocessors 211 execute application programs stored in the respectively associated local memories 212 to implement various functions.

The connector 215 is a connector for the channel controller 210 to establish connection to the storage device controller 200. When the connector 215 engages with a connector disposed on the storage device controller 200, a board on which the channel controller 210 is arranged is electrically connected to the storage device controller 200. The channel controller 210 is connected via the connector 215 to the connection unit 250 to access the shared memory 220, the cache memory 230, and the disk controllers 240.

The data transfer LSI block 500 is a unit to transfer data between devices according to an instruction from the microprocessors 211. As a master (initiator) of the PCI bus and the PCI-X bus, the LSI block 500 can send data to buses 2101 to 2104. The LSI block 500 can also operate as a target device to receive a command from devices connected to the buses 2101 to 2104 such as the microprocessors 211 and the communication interfaces 213. Having received a command from the microprocessor 211, the LSI block 500 can return a split reply to the microprocessor 211, the split reply indicating that a response to the command will be sent later. This implements so-called "split transaction" in which a cycle for the initiator to send a command to a target is different from a cycle for the target to return a replay to the initiator. The PCI-X standard stipulates the split transaction, and the buses 2101 and 2102 conform to the PCI-X standard. Therefore, the split transaction can be implemented between the data transfer LSI block 500 and the microprocessors 1 and 2 (211) to advantageously increase a bus use ratio indicating efficiency of use of buses.

As can be seen from FIG. 2, the data transfer LSI block 500 includes four bridges, i.e., bridges A to D (501 to 504) to establish connection between buses, buffer controllers (BUFCTL) 1 and 2 (505) to access respectively associated data buffers 1 and 2 (214), and a mode selector 506.

Bridge C 503 (first bus bridge, first bus interface), bridge A 501 (second bus bridge, second bus interface), bridge D 504 (third bus bridge, third bus interface), and bridge B 502 (fourth bus bridge, fourth bus interface) are devices to transfer data between buses.

Bridge A 501 is connected to the bus 2101. Bridge A 501 communicates data via the bus 2101 with the microprocessor 1 (211). Bridge B 502 is connected to the bus 2102. Bridge B 502 communicates data via the bus 2102 with the microprocessor 2 (211).

Bridge C 503 is connected to the bus 2103. Bridge C 503 communicates data via the bus 2103 with the communication interface 1 (213). Bridge D 504 is connected to the bus 2104. Bridge D 504 communicates data via the bus 2104 with the communication interface 2 (213).

The mode selector 506 is a signal line to set a mode in which the buses 2103 and 2104 to connect the data transfer LSI block 500 to the communication interfaces 1 and 2 (213) are PCI buses or PCI-X buses. While a high-level signal is being supplied to the mode selector 506, the mode selector 506 can assume that the buses 2103 and 2104 are PCI-X buses to communicate signals according to the PCI-X standard. The mode selector 506 may be other than a signal line, for example, may be a switch. It is also possible to determine the bus type of the buses 2103 and 2104 according to a value set by the processor to the associated local memory. In this way, the LSI block 500 can establish connection to the buses conforming to the PCI and PCI-X standards. It is also possible that the LSI block 500 copes with the buses conforming to standards other than the PCI and PCI-X standards.

As above, the data transfer LSI block 500 can establish connection to buses conforming to a plurality of standards. Therefore, the storage controller 200 including the LSI block 500 can flexibly cope with various standards even in a situation in which old standards and new standards provided as a result of progress of techniques are used at the same time.

Data Transfer Processing 1

Figure 3:
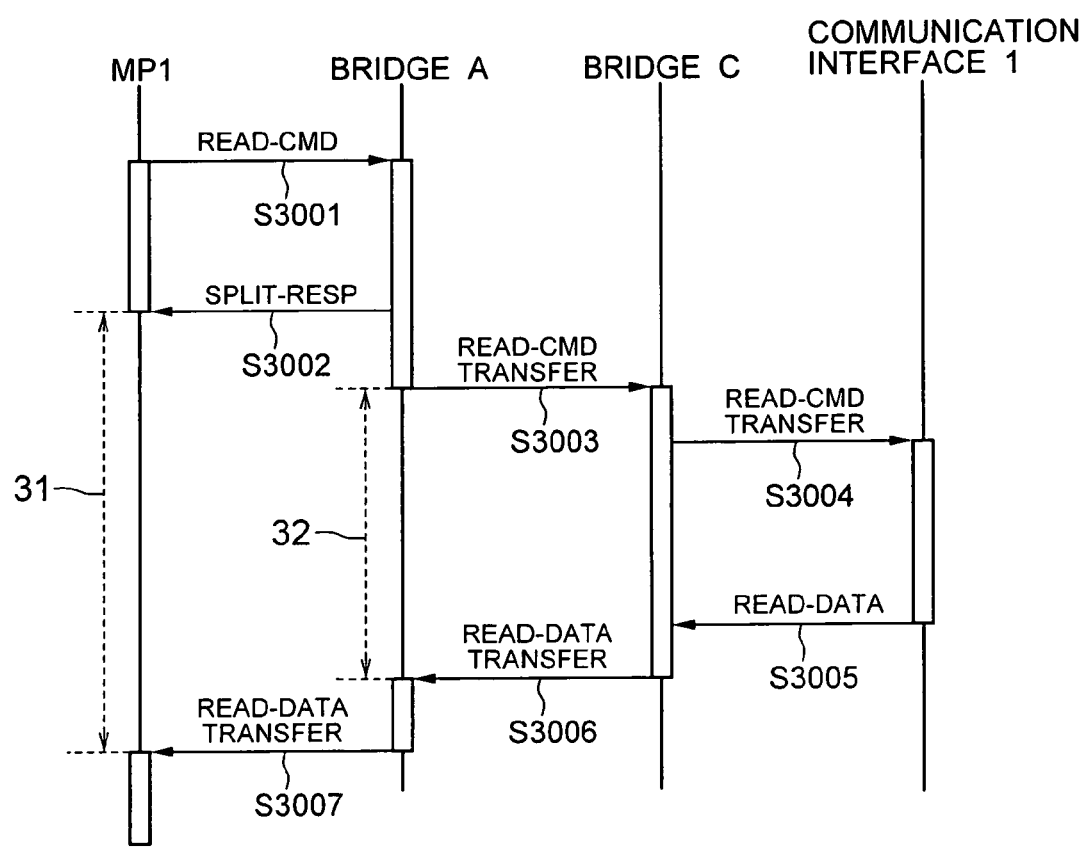
FIG. 3 is a flow diagram showing a flow of data transfer processing in the embodiment.

FIG. 3 shows a flow of data transfer processing of the embodiment in a flow diagram. In the flow of FIG. 3, the microprocessor 1 (211) sends a read command (a readout command) requesting acquisition of data to the communication interface 1 (213) and then receives data from the communication interface 1 (213). The data transfer processing shown in FIG. 3 is used as processing to transfer information items when the data transfer LSI block 500 transfers data, for example, from the data buffer 214 to the cache memory 230. It is required in this situation for the LSI block 500 to acquire information items such as a data length and an address necessary to transfer data.

The microprocessor 1 (211) obtains the right to use the bus 2101 and then sends the read command (READ-CMD) to bridge A 501 (S3001). Having received the read command, bridge A 501 sends a split response (SPLIT-RESP) to the microprocessor 1 (211) (S3002). When the split response is received, the microprocessor 1 (211) releases the right to use the bus 2101. Therefore, until the data corresponding to the read command is received, the microprocessor 1 (211)

can execute other processing. In FIG. 3, a period of time 31 is the period in which the microprocessor 1 (211) can execute other processing.

Bridge A 501 transfers the read command to bridge C 503 (S3003). At this point, bridge A 501 is set to a state in which bridge A 501 is prevented from receiving any other command. Having received the read command, bridge C 503 obtains the right to use the bus 2103 and sends the read command to the communication interface 1 (213) (S3004).

Having received the read command, the communication interface 1 (213) creates according to the read command, for example, read data (READ-DATA) such as a data length for the data input/output request received from the information processor 100. After having created the read data, the communication interface 1 (213) sends the data to bridge C 504 (S3005). If the bus 2103 is a bus such as a PCI bus which cannot handle a split transaction, bridge C 503 is set to a busy state from the step of S3004 to the step of S3005 during which the communication interface 1 (213) creates the read data. Since bridge C 503 has the right to use the bus 2103, bus 2103 is also set to a busy state.

If bridge A 501 is set at this point of time to a state to await data from the communication interface 1 (213), bridge A 501 is set to a busy state also during a period of time 32 in which any other command can be received. However, bridge A 501 can elongate the pertinent period for the period 32 to receive a command. In the embodiment, bridge A 501 is connected to bridge C 503 and bridge D 504. Therefore, even when bridge C 503 is in the busy state, the bridge A 501 can transfer a command to bridge D 504. This resultantly elongates the period time for bridge A 501 to receive the command. Therefore, the data transfer LSI block 500 can receive a larger number of commands and hence can conduct operations more efficiently.

On the other hand, when the read data is received from the communication interface 1 (213), bridge C 503 releases the right to use the bus 2103 and transfers the read data to bridge A 501 (S3006).

Having received the read data from the communication interface 1 (213), bridge A 501 obtains the right to use the bus 2101, sends the read data to the microprocessor 1 (211), and then releases the right to use the bus 2101.

As above, when the microprocessor 211 (processor) sends the read command (readout command) to the communication interface 213 (communication interface section), the data transfer LSI block 500 can send a split response to the microprocessor 211 before receiving read data as the response to the read data request from the communication interface 213. Therefore, the microprocessor 211 can execute other processing without awaiting the read data from the communication interface 213. The microprocessor 211 can consequently operate more efficiently. Increase in the processing efficiency of the microprocessor 211 also improves the overall processing efficiency of the storage device controller 200.

In the embodiment, the operation in which the microprocessor 1 (211) obtains the right to use the bus 2101 is assumed to be carried out using an arbitration circuit generally used for buses such as the PCI bus. The microprocessor 1 (211) sends a request signal indicating use of the bus 2101 to an arbitration circuit (not shown), for example, in bridge A 501. The arbitration circuit sends a response signal to the microprocessor 1 (211) indicating grant for the use of the bus 2101. Through the operation, bridge A 501 can give the right to use the bus 2101 to a device connected to the bus 2101. Also, bridges B to D (502 to 504) respectively include arbitration circuits to give the right to use the buses 2102 to 2104 to devices respectively connected thereto.

Figure 4:
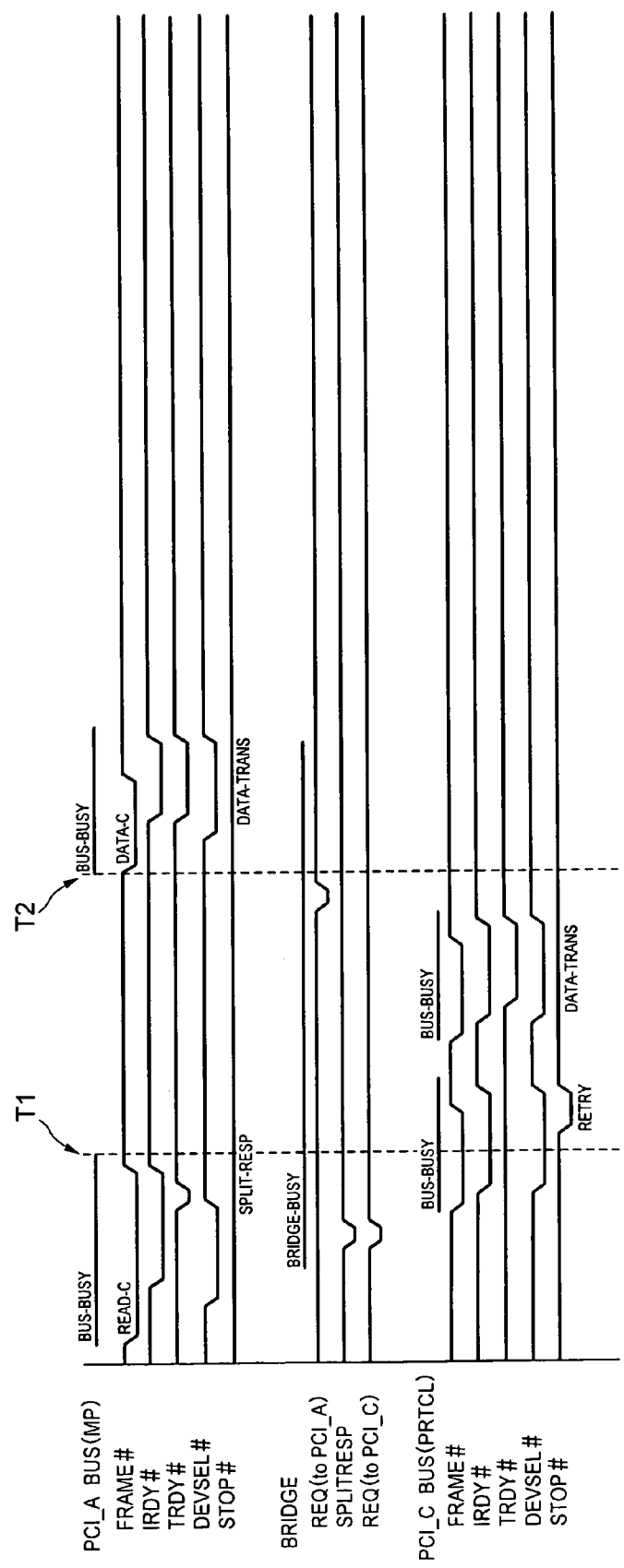
FIG. 4 is a signal timing chart for explaining signals of the data transfer processing shown in FIG. 3.

Next, the data transfer processing will be described by referring to a signal timing chart. FIG. 4 shows states of signals used in the data transfer processing in a signal timing chart.

After bridge A 501 returns a split response to the microprocessor 1 (211), the microprocessor 1 (211) releases the right to use the bus 2101 at a point of time T1.

After the communication interface 1 (213) transmits the read data to bridge A 501 (DATA-TRANS), bridge A 501 receives the read data. Bridge A 501 then starts transmitting the read data to the microprocessor 1 (211) at a point of time T2.

As shown in FIG. 4, the right to use the bus 2101 is kept released during a period of time between T1 and T2. Since bridge A 501 is in the busy state during the period of time between T1 and T2, the microprocessor 1 (211) cannot send a command to bridge A 501. However, the microprocessor 1 (211) can execute other processing, for example, processing to communicate information with other devices connected to the bus 2101. Therefore, the microprocessor 1 (211) can conducts more efficient operations.

Figure 5:
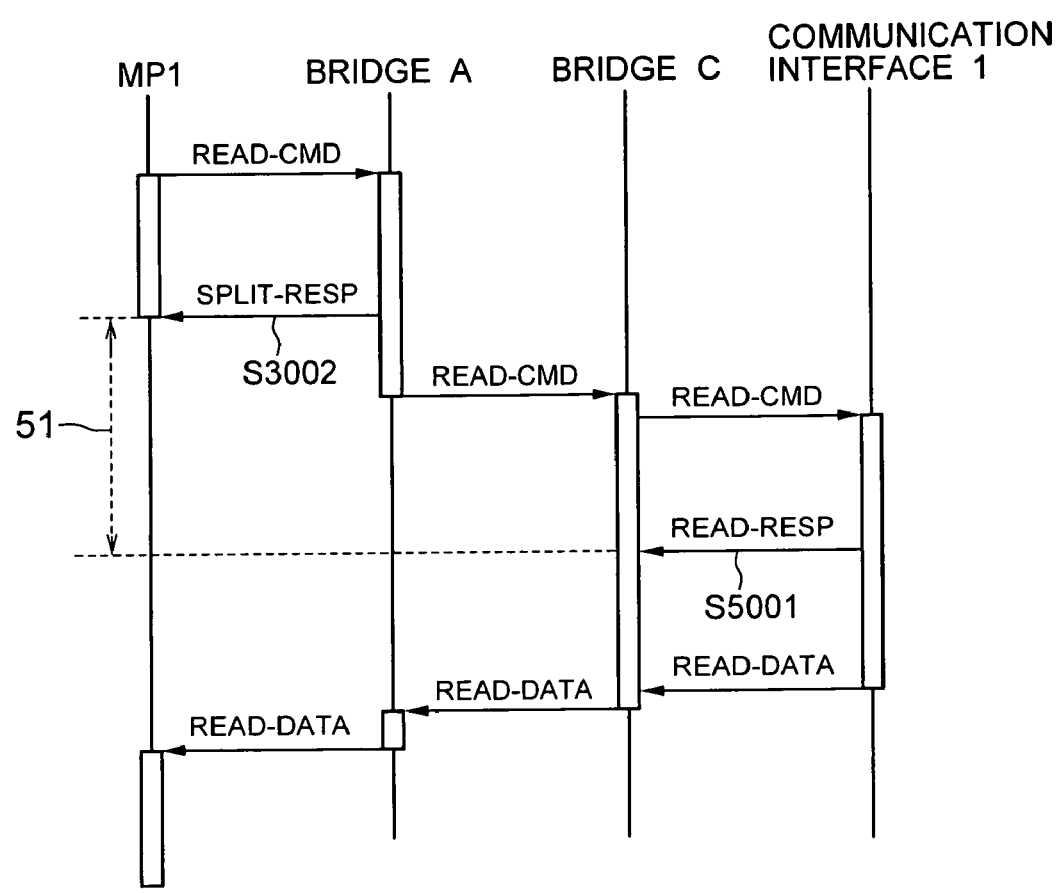
FIG. 5 is a flow diagram showing a flow of data transfer processing in the embodiment.

Although the bus 2103 is a PCI bus in the embodiment, the bus 2103 may be a PCI-X bus. In such a case, the communication interface 1 (213) can return a split response to bridge C 503. FIG. 5 shows a flow of the data transfer processing of FIG. 3 when the bus 2103 is a PCI-X bus.

The flow of FIG. 5 is almost the same as that of FIG. 3. However, the difference between the flows resides in that the communication interface 1 (211) sends a split response in FIG. 5 according to the read command received from bridge C 503. Bridge A 501 sends (S3002) a split response according to the read command from the microprocessor 1 (211). It is also possible that bridge C 503 transfers the split response received from the communication interface 1 (213) to bridge A 501 and bridge A 501 transfers the split response to the microprocessor 1 (211). However, when compared with the processing of this case, the data transfer processing of the embodiment allows a longer processing period for the microprocessor 1 (211). Specifically, the processing period is elongated by a period of time 51 shown in FIG. 5.

Data Transfer Processing 2

Figure 6:
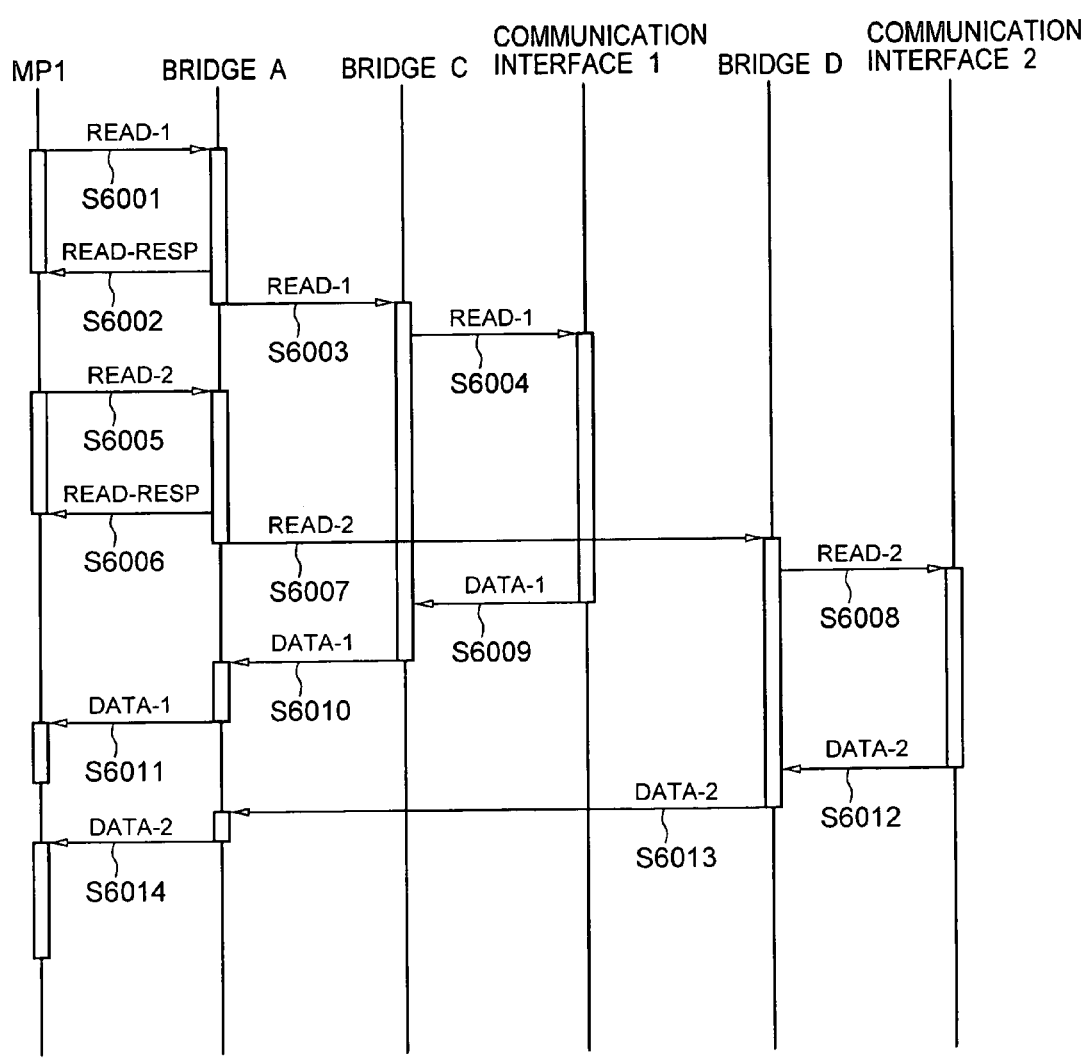
FIG. 6 is a flow diagram showing a flow of data transfer processing in the embodiment.

FIG. 6 shows a processing flow when the microprocessor 1 (211) reads data from the communication interfaces 1 and 2 (213).

The microprocessor 1 (211) obtains the right to use the bus 2101 and sends to bridge A 501 a read command 1 (READ-1) to access the communication interface 1 (213) (S6001). Bridge A 501 returns a split response to the microprocessor 1 (211) (S6002), and then the microprocessor 1 (211) releases the right to use the bus 2101. Bridge A 501 transfer the read command 1 to bridge C 503 (S6003). Bridge C 503 obtains the right to use the bus 2103 and sends the read command 1 to the communication interface 1 (213) (S6004). The communication interface 1 (213) creates read data 1 (DATA-1) according to the read command 1.

During the operation, the microprocessor 1 (211) obtains again the right to use the bus 2101 and sends a read command 2 (READ-2) to bridge A 501 to access the communication interface 2 (213) (S6005). Bridge A 501 returns a split response to the microprocessor 1 (211) (S6006), and then the microprocessor 1 (211) releases the right to use the bus 2101. Bridge A 501 transfers the read command 2 to bridge D 504 (S6007). Bridge D 504 obtains the right to use the bus 2104 and sends the read command 2 to the communication interface 2 (213) (S6008). The communication interface 2 (213) creates read data 2 (DATA-2) according to the read command 2.

Having created the read data 1 according to the read command 1, the communication interface 1 (213) returns the read data 1 to bridge C 503 (S6009). Bridge C 503 receives the read data 1, releases the right to use the bus 2103, and transfers the read data 1 to bridge A 501 (S6010). Bridge A 501 obtains the right to use the bus 2101, sends the read data 1 to the microprocessor 1 (211), and releases the right to use the bus 2101.

Having created the read data 2 according to the read command 2, the communication interface 2 (213) returns the read data 2 to bridge D 504 (S6012). Bridge D 504 receives the read data 2, releases the right to use the bus 2104, and transfers the read data 2 to bridge A 501 (S6013). Bridge A 501 obtains the right to use the bus 2101, sends the read data 1 to the microprocessor 1 (S6014), and releases the right to use the bus 2101.

In this way, data is transferred between the microprocessor 1 (211) and the communication interfaces 1 and 2 (213). In the data transfer processing, bridge A 501 sends a split response to the microprocessor 1 (211) in the step of S6002, transfers the read command 1 to bridge C 503, and then enters a state other than the busy state. Therefore, the microprocessor 1 (211) can transmit the read command 2 to bridge A 501 without using retransmission (S6005).

Figure 7:
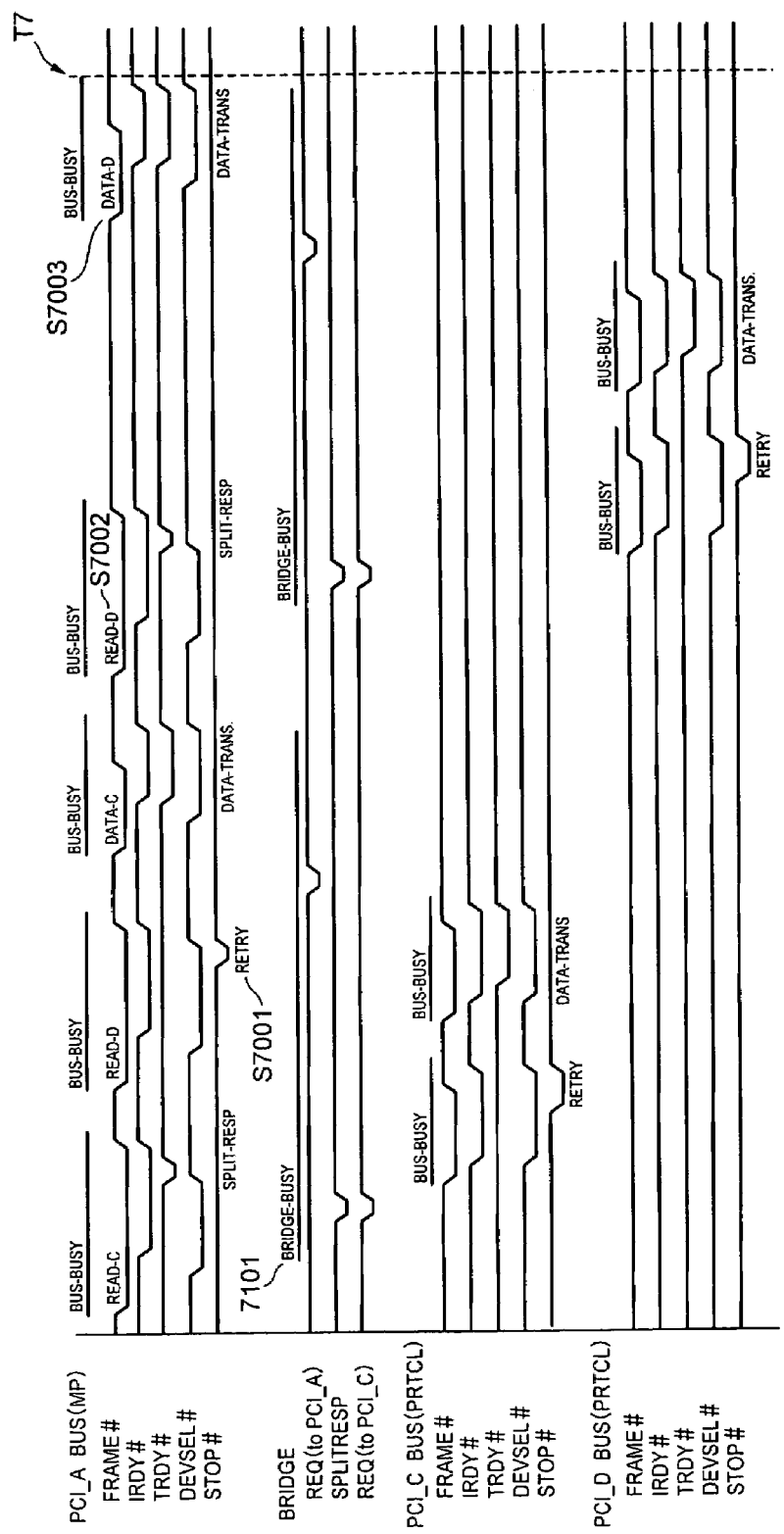
FIG. 7 is a flowchart for explaining signals of the data transfer processing in the embodiment.
Figure 8:
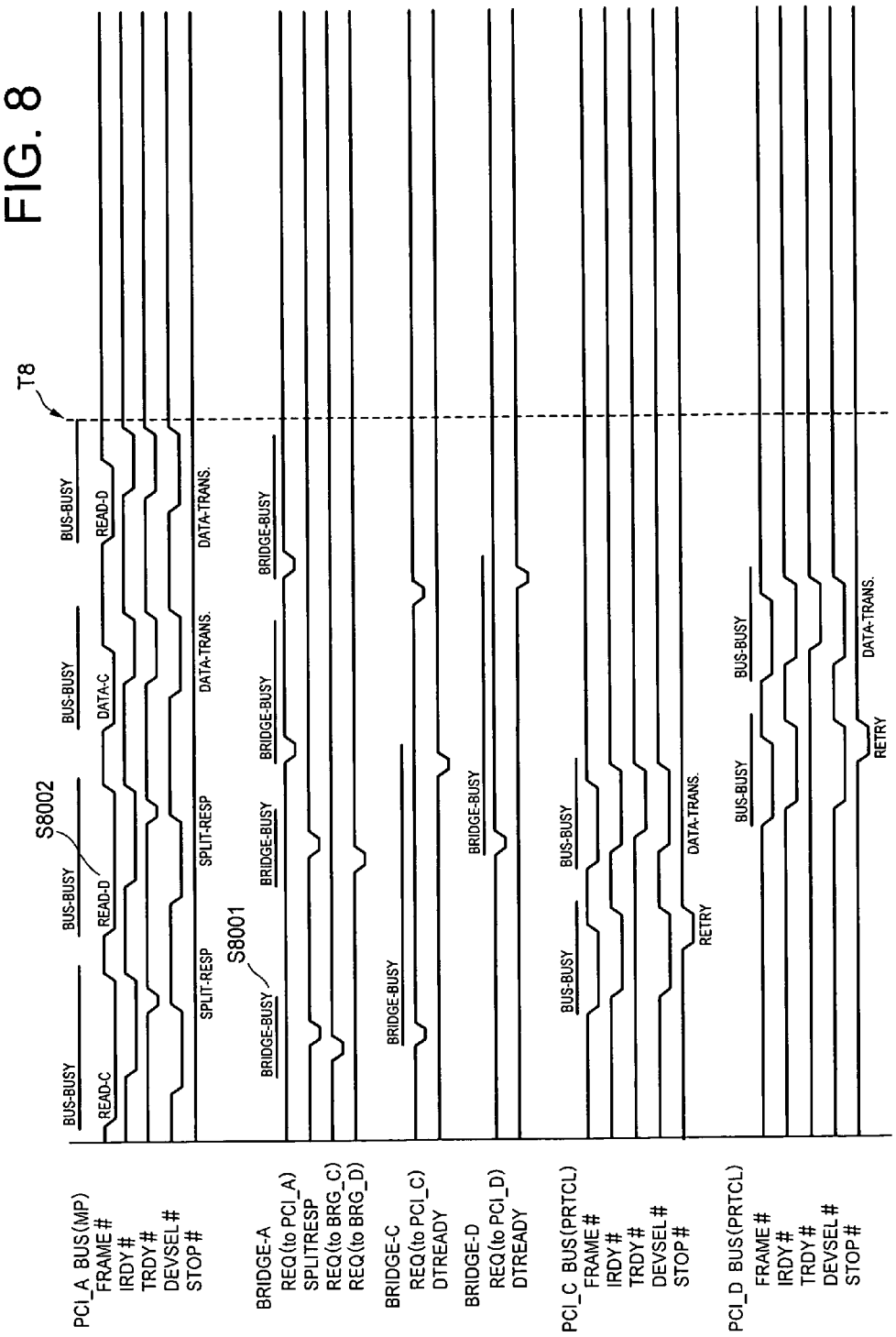
FIG. 8 is a flowchart for explaining signals of the data transfer processing in the embodiment.

FIGS. 7 and 8 are signal timing charts to explain signals used in the data transfer processing when the microprocessor 1 (211) reads data from the communication interfaces 1 and 2 (213).

The signal timing chart of FIG. 7 corresponds to the data transfer processing in a configuration in which bridge A 501 is directly connected to the buses 2103 and 2104 without establishing connections to bridges C and D (503 and 504). The signal timing chart of FIG. 8 corresponds to signals used in the data transfer processing shown in FIG. 6.

In FIG. 7, bridge A 501 is kept in the busy state (BRIDGE-BUSY 7101) in a period of time from when the read command 1 is sent to the communication interface 1 (213) to when the read data 1 is received. Therefore, the microprocessor 1 (211) cannot send the read command 2 to bridge A 501. It is necessary for the microprocessor 1 (211) to retry (RETRY) the transmission (S7001). The microprocessor 1 (211) retransmits the read command 2 (S7002) and receives the read data 2 from the communication interface 2 (213). The reception of the read data 2 completely finishes at a point of time T7.

In comparison with the operation in FIG. 7, bridge A 501 sends in FIG. 8 a split response to the microprocessor 1 (211) in response to the read command 1 and then enters a state other than the busy state. Therefore, when the microprocessor 1 sends the read command 2 to bridge A 501 (S8002), bridge A 501 can receive the read command 2. That is, it is not required for the microprocessor 1 (211) to retransmit the read command 2. The microprocessor 1 (211) receives the read data 2 from the communication interface 2 (213). The reception of the read data 2 completely finishes at a point of time T8.

As indicated by the difference between T7 and T8, the data transfer LSI block 500 of the embodiment helps minimize the period of time required for the data transfer processing. According to the present invention, when the read command 1 (first readout command) is received, bridge C 503 (first bus interface section) is not set to the busy state and hence can receive the read command 2 (second readout command). That is, the microprocessor 1 (211) can send the second command to the data transfer LSI block 500 without entering a wait state before transmitting the read command 2 (second command). After having sent the first and second commands, the microprocessor 1 (211; processor) receives a split response. Therefore, until read data corresponding to the first and second commands is received, it is not necessary for the microprocessor 1 (211) to occupy the bus 2101. That is, the microprocessor 1 (211) can immediately release the right to use the bus 2101. The bus 2101 can therefore be more efficiently used. The microprocessor 1 (211) can execute other processing without awaiting reception of the read data. The microprocessor 1 (211) can consequently be more efficiently used. This increases processing efficiency of the microprocessor 1 (211) and hence the overall processing efficiency of the storage device controller 200.

Figure 9:
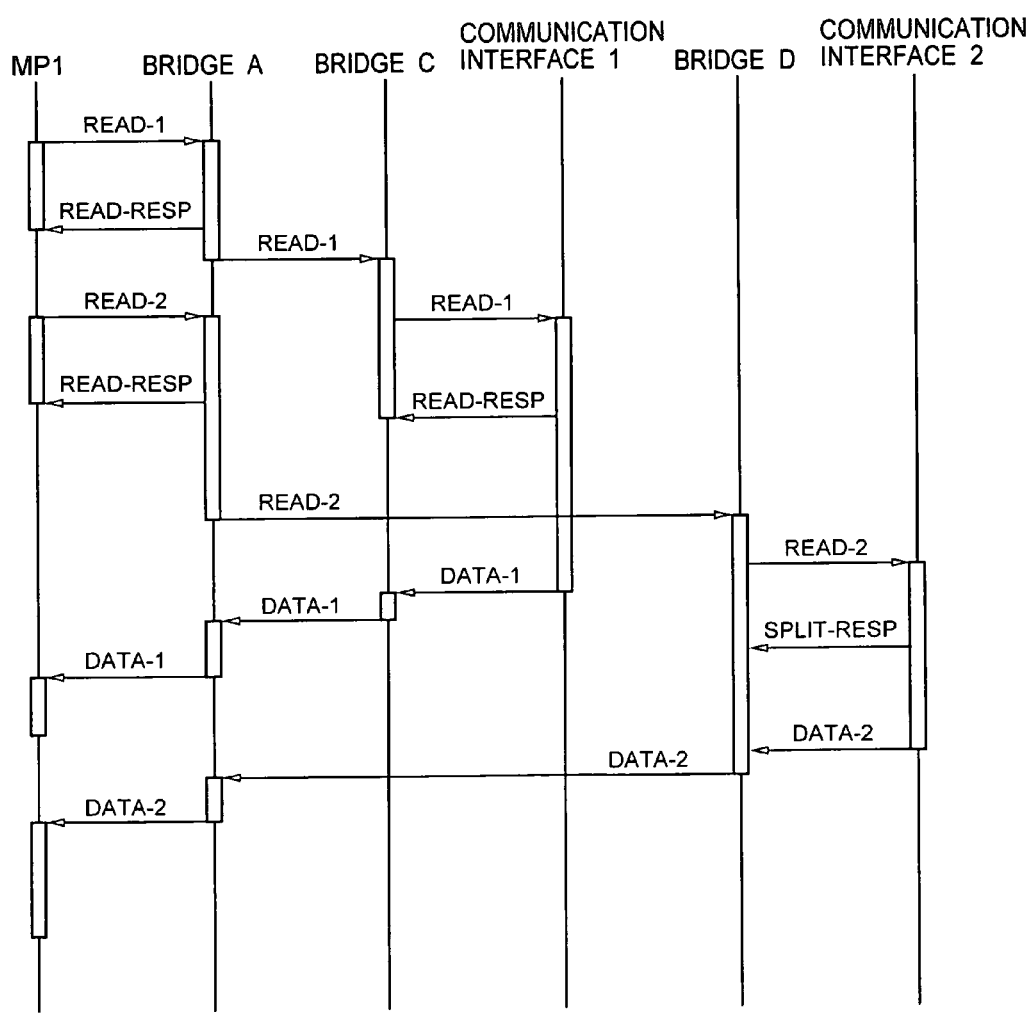
FIG. 9 is a flow diagram showing a flow of data transfer processing in the embodiment.

FIG. 9 shows a flow of the data transfer processing when the buses 2103 and 2104 are PCI-X buses. In FIG. 9 as in FIG. 6, when the split response to the read command 1 is received from bridge A 501, the microprocessor 1 (211) can send the read command 2 to bridge A 501 before receiving the read data 1 associated with the read command 1, without using retransmission.

In the transmission of a command from the microprocessor 211 to the communication interface 213 as well as in the transmission of a command from the communication interface 213 to the microprocessor 211, the period of time required for the data transfer processing can be minimized.

Figure 10:
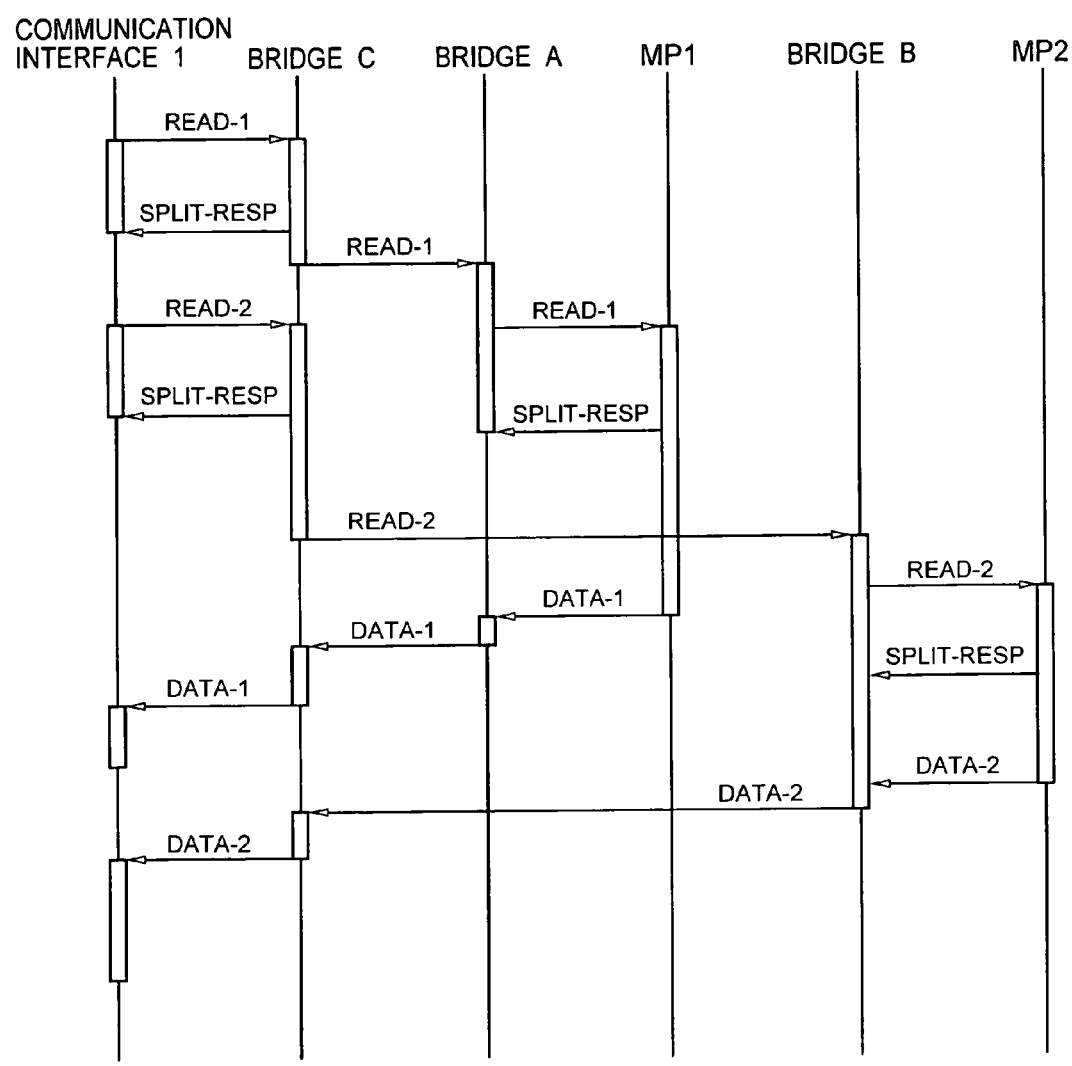
FIG. 10 is a flow diagram showing a flow of data transfer processing in the embodiment.

FIG. 10 shows a flow of the data transfer processing when the communication interface 1 (213) sends a read command to the microprocessors 1 and 2 (211). It is assumed in FIG. 10 that the bus 2103 connected to the communication interface 1 (213) is a PCI-X bus. In FIG. 10 as in FIG. 9, bridge C 503 can also receive the read command 2 before receiving the read data from the microprocessor 1 (211) in response to the read command 1. Therefore, after having received the split response to the read command 1 from bridge C 503, the communication interface 1 (213) can transmit the read command 2 to bridge C 503. The communication interface 1 (213) can hence minimize the period of time required for the transmission of the read command 2. The communication interface 1 (213) can use a longer period of time to execute processing other than the transmission of the read command. Since the communication interface 1 (213) can receive a larger number of data input/output requests from the information processor 100, the storage device controller 200 can advantageously access a larger number of storage devices.

Data Transfer Processing 3

Figure 11:
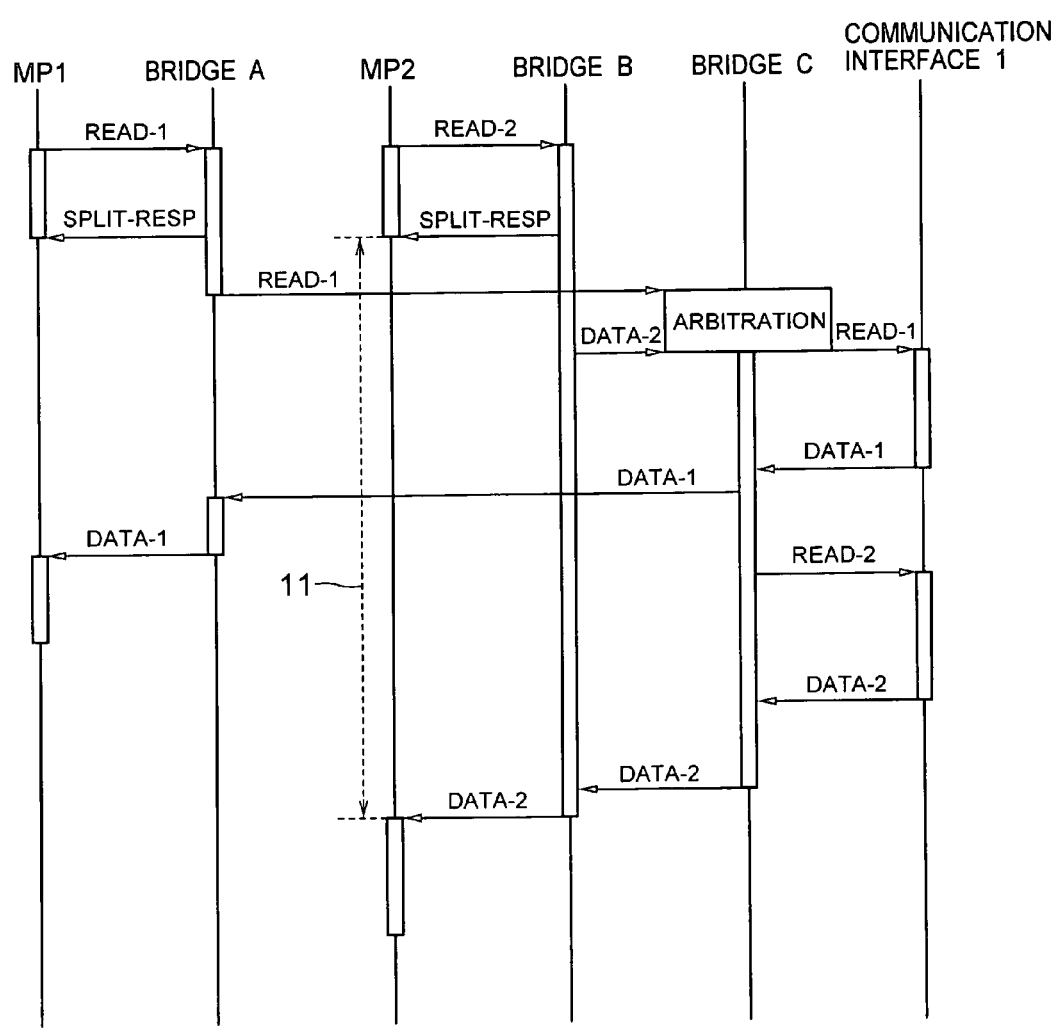
FIG. 11 is a flow diagram showing a flow of data transfer processing from microprocessors 1 and 2 to a communication interface 1 in the embodiment.

FIG. 11 shows a flow of processing when the microprocessors 1 and 2 (211) sends a read command 1 to the communication interface 1 (213). It is assumed in the description that the microprocessors 211, the communication interfaces 213, and the bridges 501 to 504 obtain the right to use a bus to send a command and then release the right to use the bus when a response is received in response to the command.

The microprocessor 1 (211) sends to bridge A 501 a read command 1 (READ-1) to the communication interfaces 1 (213). Bridge A 501 sends a split response to the microprocessors 1 (211) (S11002) and transfers the read command 1 to bridge C 503 (S11003).

At almost same timing, the microprocessors 1 (211) sends to bridge B 502 a read command 2 (READ-2) to the communication interfaces 1 (213) (S11004). Bridge B 502 sends a split response to the microprocessor 2 (211) (S11005) and transfers the read command 2 to bridge C 503 (S11006).

Bridge C 503 receives the read command 1 from bridge A 501 and the read command 2 from bridge B 502 almost at the same time. Arbitration is conducted such that two commands are not sent to the communication interfaces 1 (213) at the same time (S11007). Bridge C 503 can send, for example, one of the read commands 1 and 2, which is first received, to the communication interfaces 1 (213). It is assumed in FIG. 11 that the read command 1 is first transferred to bridge C 503. Bridge C 503 transfers the first received command, i.e., the read command 1 to the communication interfaces 1 (213) (S11008). The communication interfaces 1 (213) creates data 1 (DATA-1) corresponding to the read command 1. The communication interface 1 (213) sends the data 1 to bridge C 503. At this point of time, since the read command 2 is not yet received by bridge C 503, bridge B 502 is in a busy state.

Bridge C 503 transfers the data 1 to bridge A 501 (S11009) and sends the read command 2 to the communication interfaces 1 (213) (S11010).

Having received the data 1 from bridge C 503, bridge A 501 sends the data 1 to the microprocessor 1 (211) (S11011).

When the read command 2 is received, the communication interfaces 1 (213) creates data 2 (DATA-2) corresponding to the read command 2. The communication interface 1 (213) sends the data 2 to bridge C 503 (S11012). Bridge C 503 transfers the data 2 to bridge B 502. Bridge B 502 sends the data 2 to the microprocessor 1 (211) (S11014).

Bridge C 503 conducts arbitration for two commands simultaneously arrived at bridge C 503 and sequentially sends these commands to the communication interfaces 1 (213) as above. In this situation, the microprocessor 2 (211) can transmit the lead command 2 to bridge B 502 without using retransmission. Therefore, after the split response is received, the microprocessor 2 (211) can execute other processing until when reception of the data 2 is started (during a period of time 11 in FIG. 11). The microprocessor 211 can therefore achieve operations more efficiently. After transferring the data 1 corresponding to the read command 1, bridge C 503 can send the read command 2 to the communication interface 1 (213) without receiving again the read command 2. When compared with the case in which the microprocessor 2 (211) retransmits the read command 2, the read command 2 can be delivered to the communication interfaces 1 (213) at an earlier point of time in this case. Therefore, the period of time required for the data transfer processing is minimized.

Figure 12:
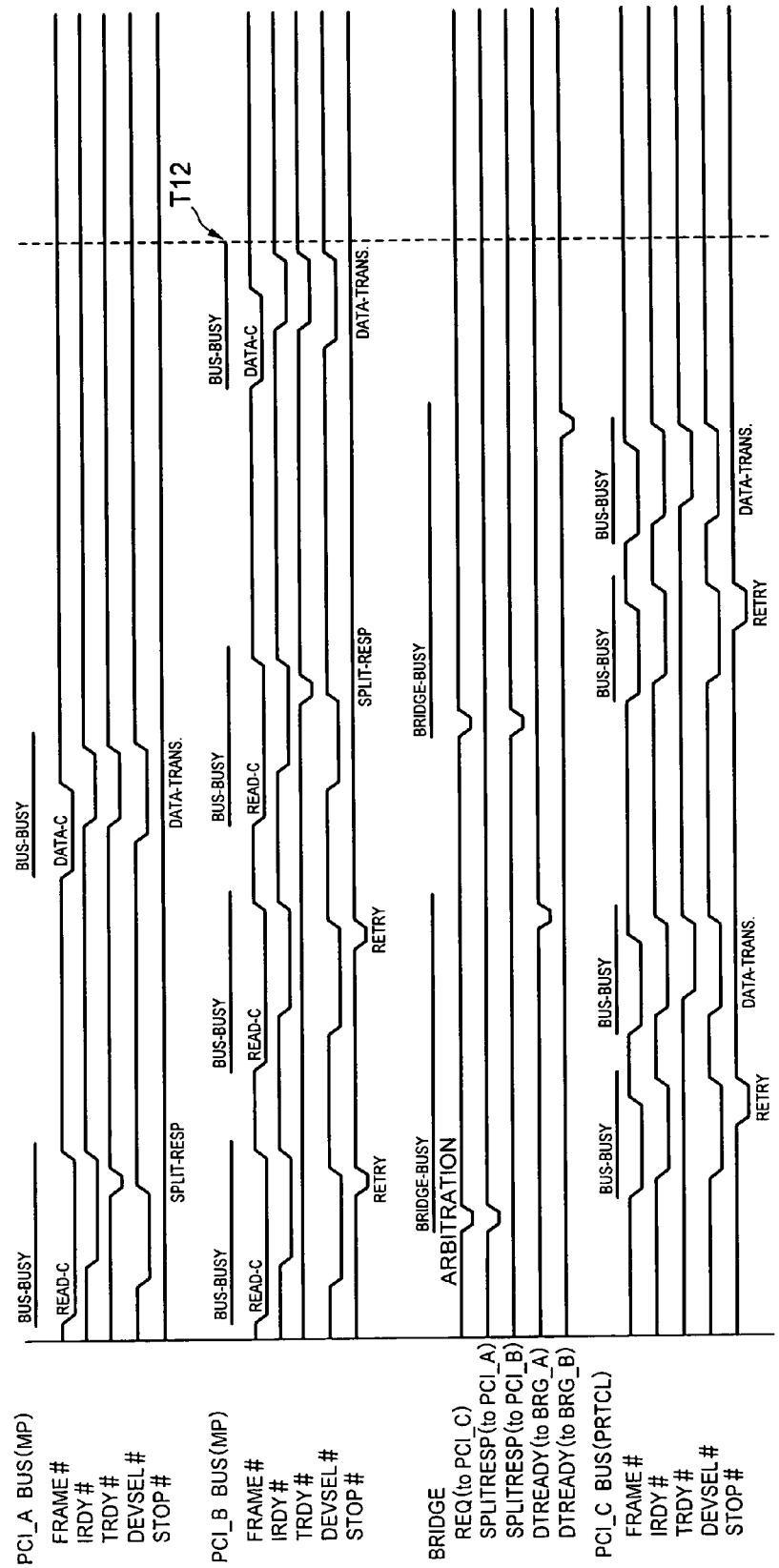
FIG. 12 is a flowchart for explaining signals of the data transfer processing in which bridge C receives a command directly from the microprocessors 1 and 2 in the embodiment.
Figure 13:
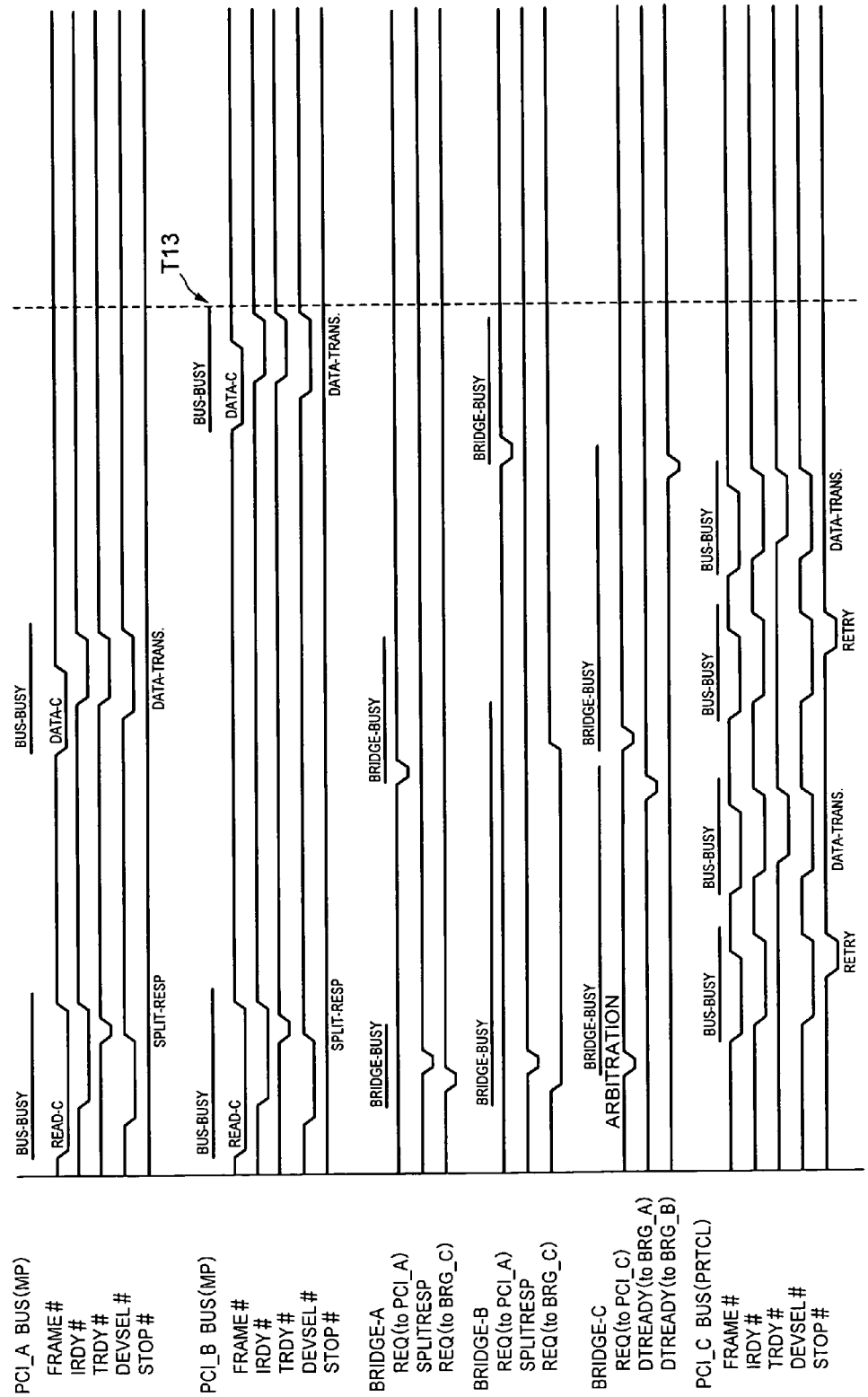
FIG. 13 is a flowchart for explaining signals of the data transfer processing shown in FIG. 11.

Signal timing charts of FIGS. 12 and 13 show the minimization of time in the data transfer processing. The chart of FIG. 12 shows processing in which bridge C 503 receives a read command directly from the microprocessors 1 and 2 (211) and the microprocessor 2 (211) retransmits a read command 2. The signal timing chart of FIG. 3 shows the processing of FIG. 11.

In FIG. 12, the microprocessor 2 (211) (PCI_B bus) cannot send the read command 2 as a result of arbitration by bridge C 503 (BRIDGE) and hence conduct retransmission (RETRY) 1201). By the second transmission of the read command 2, the microprocessor 2 (211) sends the read command 2 to bridge C 503. Bridge C 503 sends the read command 2 to the communication interface 1 (213) (PCI_C bus). The reception of the read data 2 (DATA_C) from the communication interface 1 (213) is completely terminated at a point of time T12 in FIG. 12. When compared with this processing, the microprocessor 2 (211) completely receives in the processing of FIG. 11 the read data 2 from the communication interface 1 (213) at a point of time T12 in the processing of FIG. 13. As can be seen from the difference between T12 and T13, the data transfer processing of the embodiment minimizes the period of time required for the data transfer processing.

In FIG. 13, after returning a split response in reply to the read command 2 from the microprocessor 2 (211), bridge B 502 (BRIDGE-B) enters the busy state. However, the microprocessor 2 (211) and the bus 2102 (PCI_B) are not set to the busy state. Therefore, the microprocessor 2 (211) can execute other processing until the data 2 corresponding to the read command 2 is received. The microprocessor 2 (211) can hence operate more efficiently. The period of time required for the data transfer LSI block 500 to transfer data is minimized to implement the data transfer processing more efficiently. This resultantly improves overall data transfer efficiently of the storage device controller 200.

Figure 14:
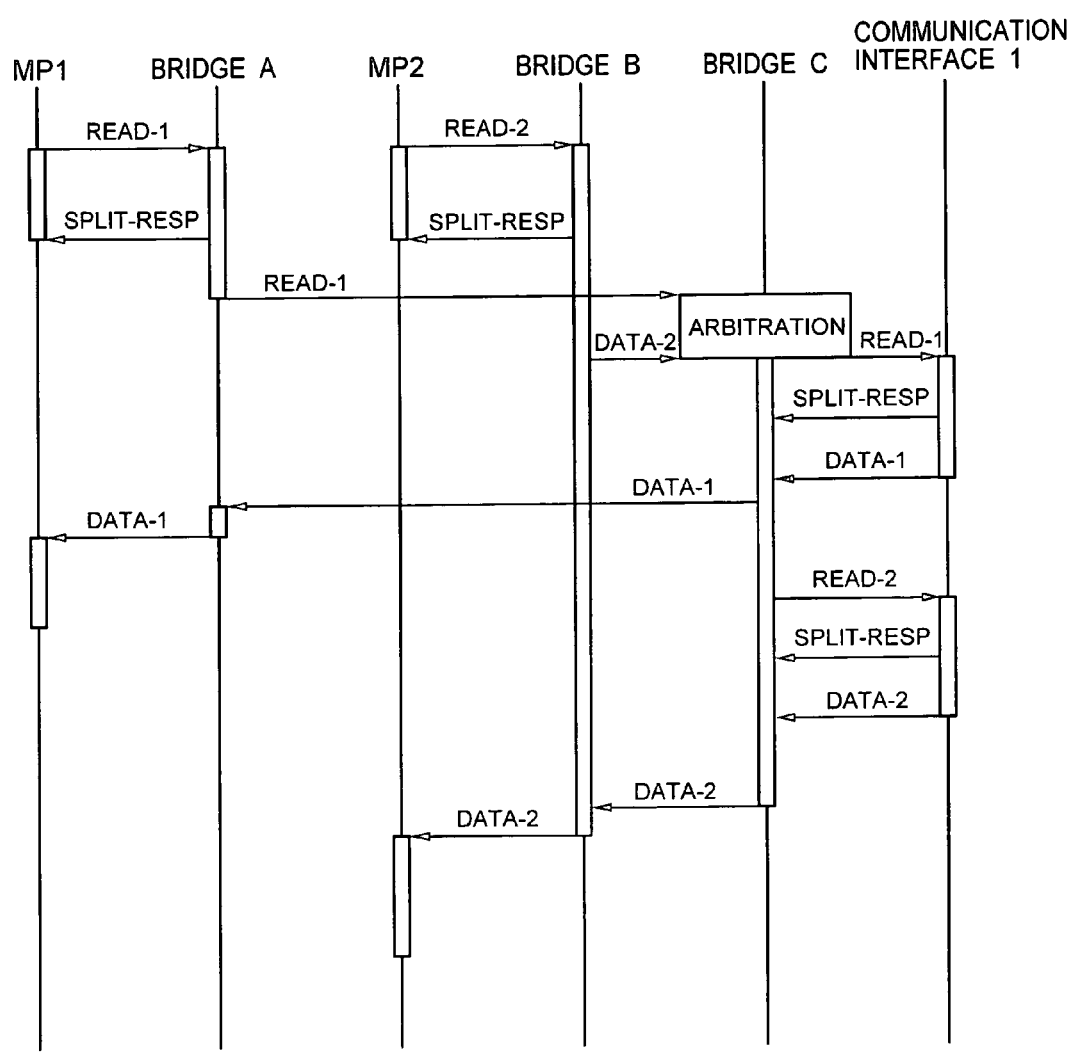
FIG. 14 is a flow diagram showing a flow of data transfer processing in which a bus 2103 is PC1-X in the embodiment.

FIG. 14 shows a flow of the data transfer processing when the bus 2103 connected to the communication interface 1 (213) is a PCI-X bus. Also in the processing corresponding to FIG. 14 as in the processing explained in conjunction with FIG. 11, bridge C 503 conducts arbitration for the read commands 1 and 2 and the microprocessor 2 (211) can execute other processing without entering the busy state. Bridge C 503 receives data 1 in response to the read command 1 and sends the data 1 to bridge A 501. Without receiving again the read command from the microprocessor 2 (211), bridge C 503 can transmit the read command 2 to the communication interface 1 (213).

Figure 15:
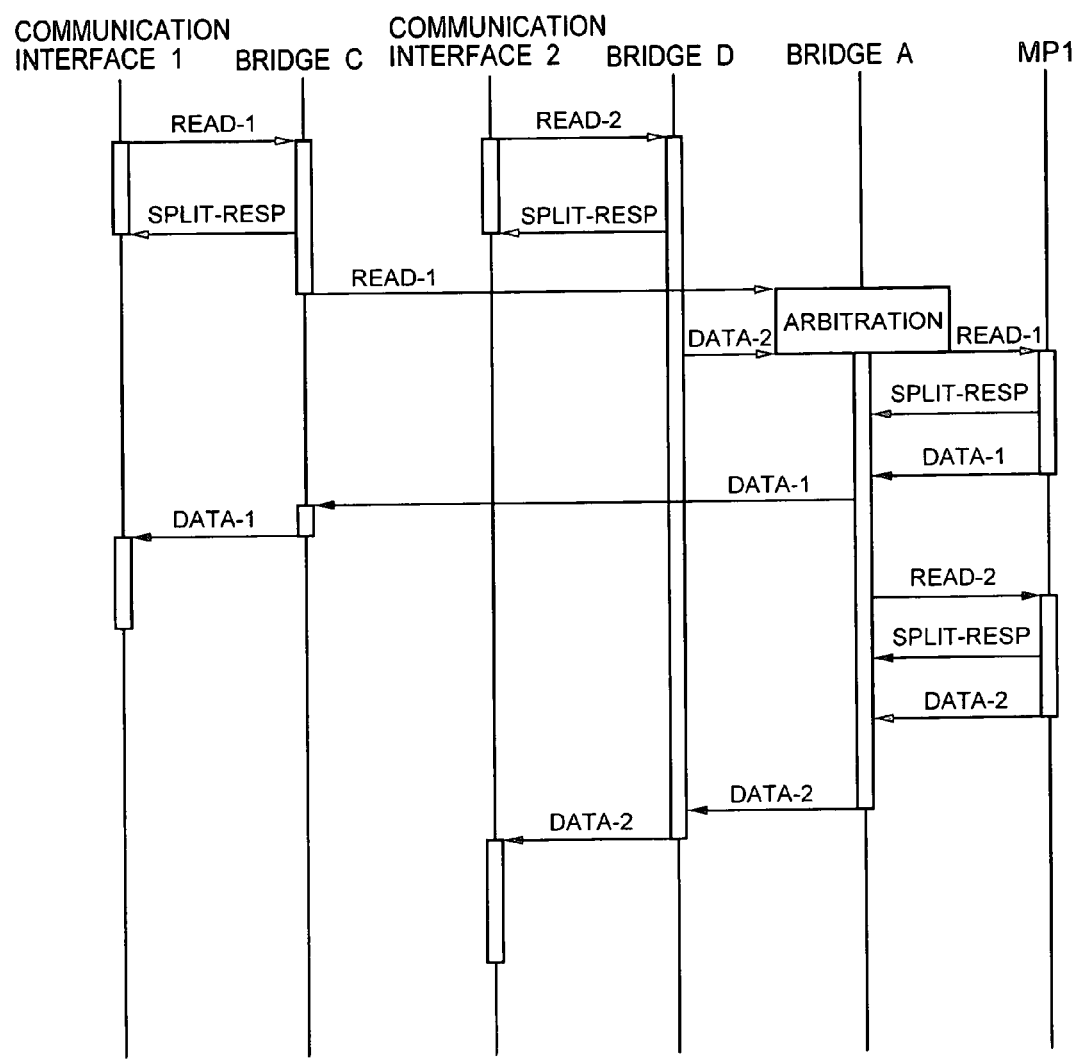
FIG. 15 is a flow diagram showing a flow of data transfer processing from communication interfaces 1 and 2 to the microprocessor 1 in the embodiment.

In the transmission of a command from the microprocessor 211 to the communication interface 213 as well as in the transmission of a command from the communication interface 213 to the microprocessor 211, the period of time required for the data transfer processing can be shortened. FIG. 15 shows a processing flow when the communication interfaces 1 and 2 (213) send a read command to the microprocessor 1 (211). Also in the example of FIG. 15, the communication interface 2 (213) can execute other processing without entering the busy state.

Data Transfer Processing 4

When the buses 2103 and 1204 are PCI-X buses, the data transfer processing shown in FIG. 15 can improve efficiency of the data transfer processing. Description will now be given of the data transfer processing when the communication interfaces 1 and 2 (213) send a read command to the microprocessor 1 (211) using PIC buses for the buses 2103 and 2104. It is assumed in the description below that the microprocessors 211, the communication interfaces 213, and the bridges 501 to 504 obtain the right to use a bus to send a command and then release the right to use the bus when a response is received in response to the command.

Figure 16:
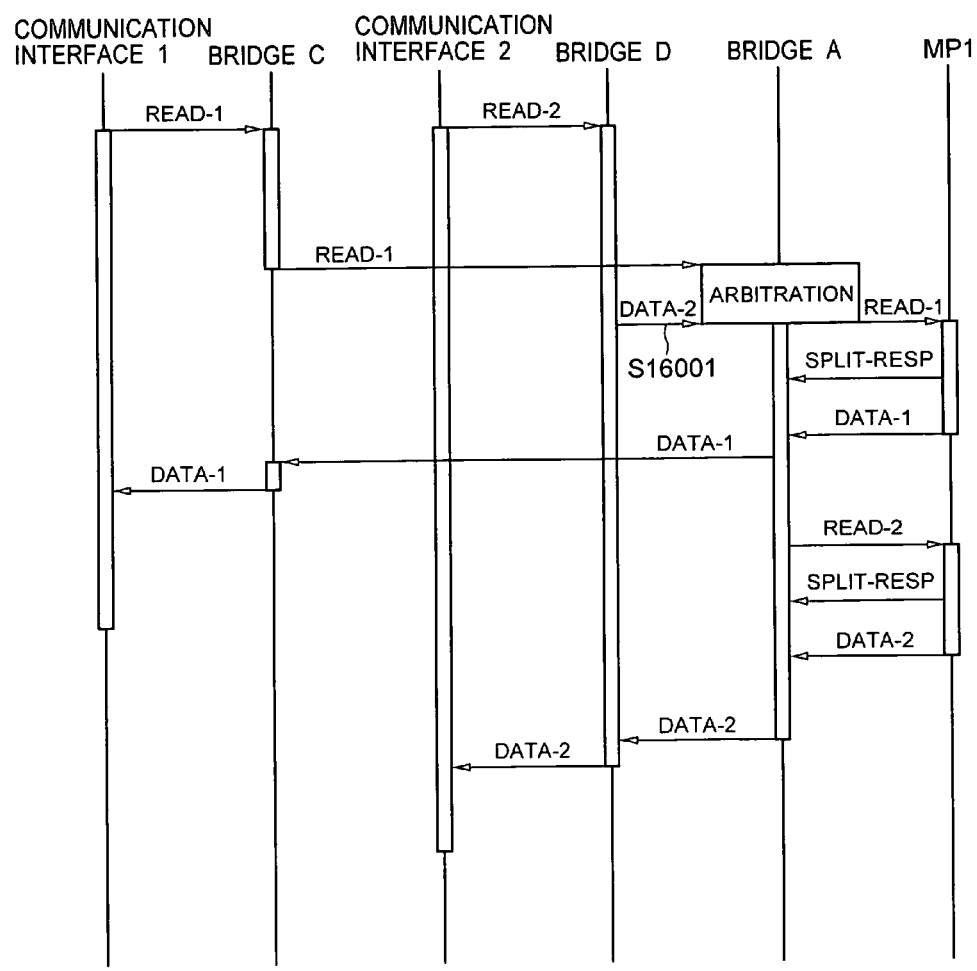
FIG. 16 is a flow diagram showing a flow of data transfer processing from communication interfaces 1 and 2 to the microprocessor 1 in the embodiment.

FIG. 16 shows a flow of processing when the communication interfaces 1 and 2 (213) send a read command to the microprocessor 1 (211). The difference between FIG. 16 and FIG. 11 described above resides in that the buses 2103 and 2104 are PCI buses and hence bridge C 503 and bridge D 504 cannot return a split response to the communication interfaces 1 and 2 (213).

In FIG. 16, at reception of a read command 2 (READ-2) in bridge A 501 (S16001), if bridge A 501 issues a retransmission request to bridge D 504 as in an ordinary arbitration circuit, it is required for the communication interface 2 (213) to again transmit the read command 2 after bridge A 501 transfers data 1 (DATA-1) to bridge C 503. However, when bridge C 503 and bridge D 504 receive the read commands 1 and 2 respectively from the communication interfaces 1 and 2 (213), bridge C 503 and bridge D 504 do not retransmit the read commands 1 and 2 to the communication interfaces 1 and 2 (213). Therefore, the communication interfaces 213 can save a period of time required for the retransmission of the read commands. This improves processing efficiency of the communication interfaces 213 and the overall processing efficiency of the data transfer processing of the storage device controller 200.

Figure 17:
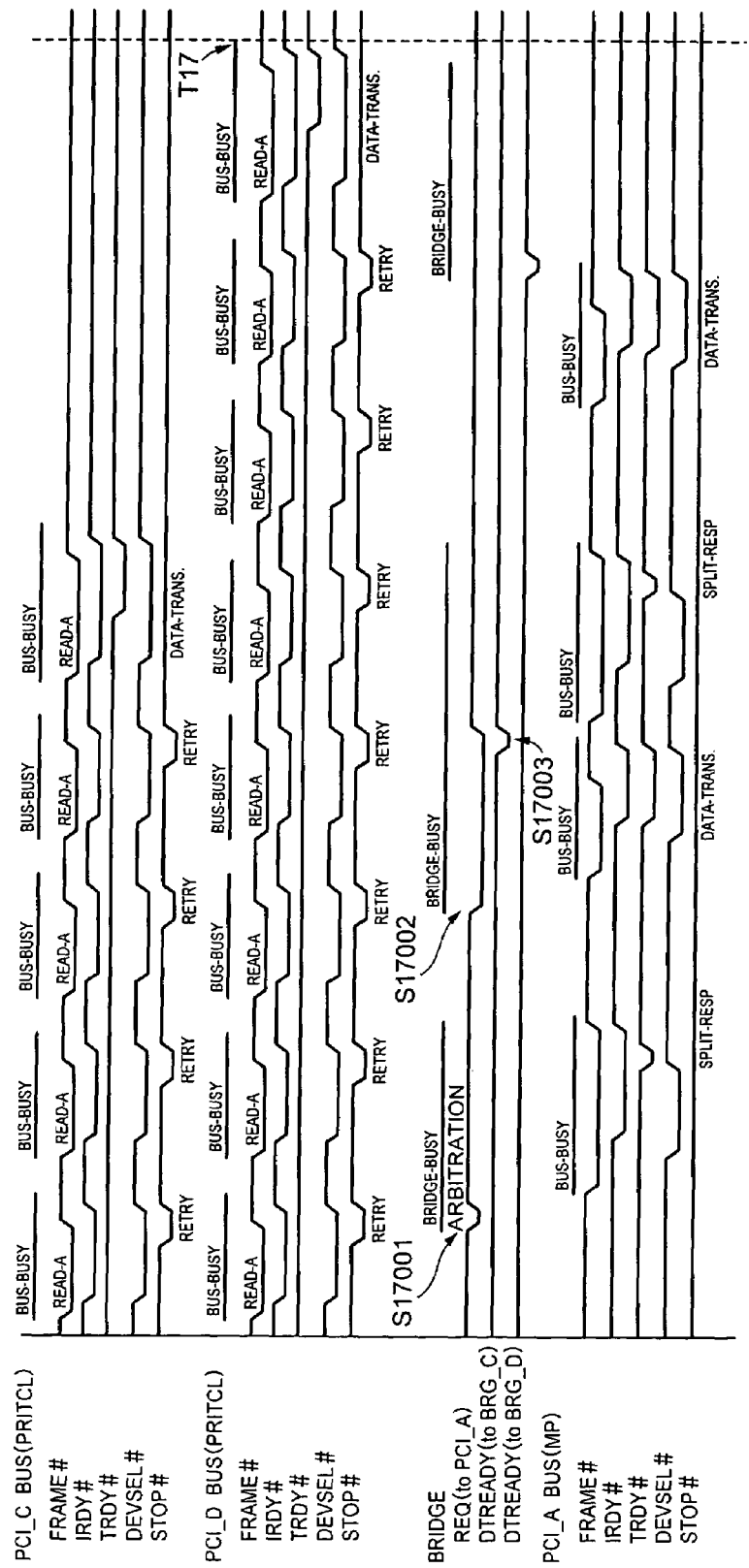
FIG. 17 is a flowchart for explaining signals of the data transfer processing in which bridge A receives a command directly from a communication interface 213 in the embodiment.
Figure 18:
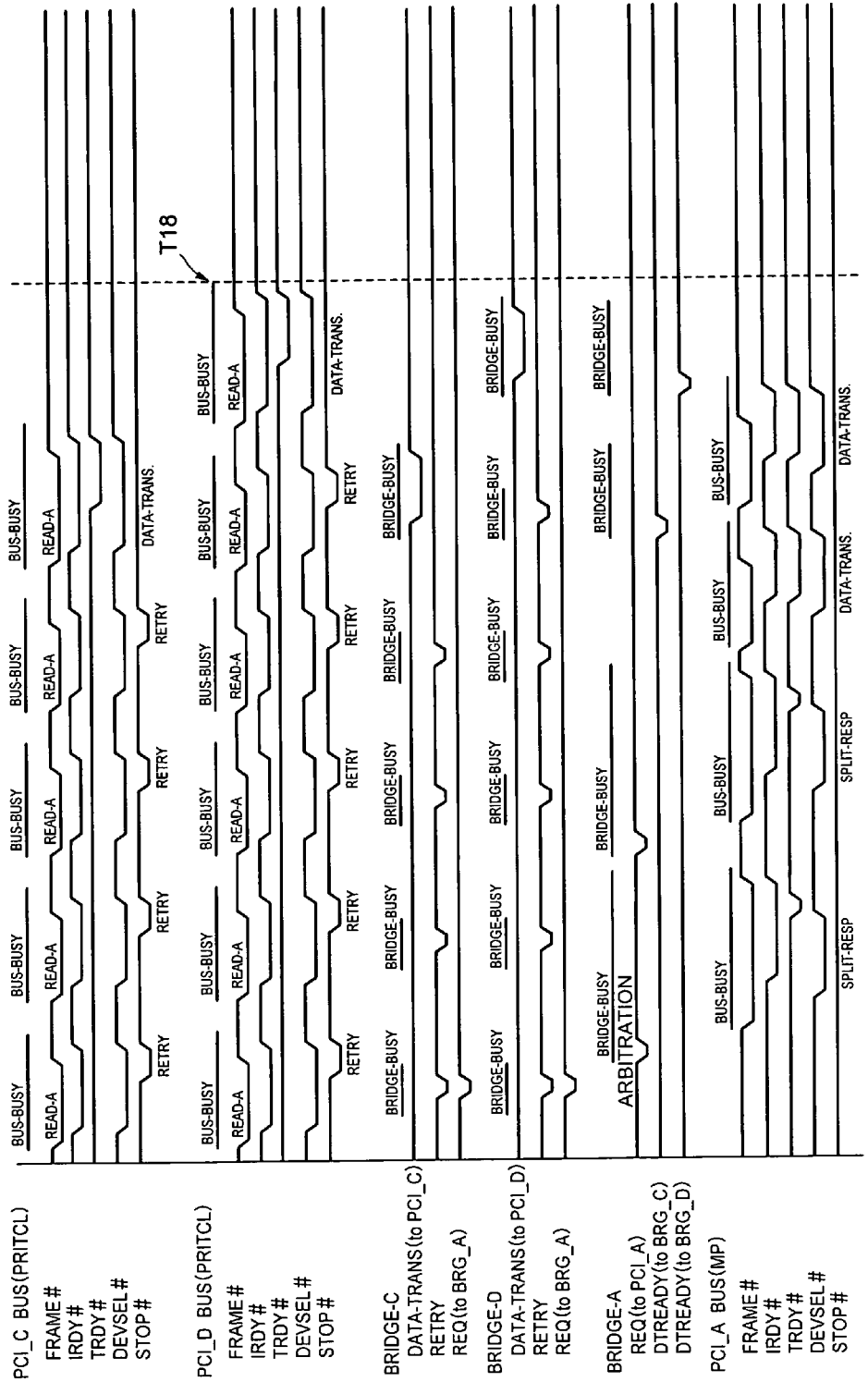
FIG. 18 is a flowchart for explaining signals in an example of the data transfer processing in which bridges C and D transfer a command directly to bridge A in the embodiment.

FIGS. 17 and 18 are signal timing charts to explain reduction of the period of time required for the data transfer processing.

FIG. 17 shows signals used when bridge A 501 (BRIDGE) receives a read command directly from the communication interfaces 1 and 2 (213). In FIG. 7, bridge A 501 conducts arbitration (17001) for read commands simultaneously received, transfers one of the read commands, which has first arrived thereat, to the microprocessor 1 (211), and sends a reply to the transmission source of the read command to request retransmission of the read command. In FIG. 17, to prevent the communication interface 213 from being kept in the busy state, bridge A 501 requests the communication interface 213 for retransmission of the read command (RETRY) until data is created for the read command.

Bridge A 501 first sends a read command 1 to the microprocessor 1 (211) and receives a split response. Although bridge A 501 receives a read command 2 retransmitted from the communication interface 2 (213) (S17002), bridge A 501 first transfers data 1 to the communication interface 2 (213) to receive a reply from the microprocessor 1 (211) in response to the data 1. After transferring the data 1 received from the microprocessor 1 (211) as above, bridge A 501 sends the read command 2 to the microprocessor 1 (211) (S17003).

At a point of time T17, the communication interface 2 (213) completely receives the read data 2.

In the data transfer processing of FIG. 18 as compared with the processing described above, bridge A 501 conducts arbitration for read commands simultaneously received and sends a read command 1 to the microprocessor 1 (211). When a split response is received from the microprocessor 1 (211), bridge A 501 sends a read command 2 to bridge A 501 without awaiting a read command 2 retransmitted from the communication interface 2 (213). Therefore, bridge A 501 can send the read command 2 also to the microprocessor 2 (211) while the microprocessor 1 (211) is creating data 1 for the read command 1. The communication interface 2 (213) completely receives data 2 at a point of time T18 shown in FIG. 18. As can be seen from the difference between T17 and T18, the period of time required for the data transfer processing is minimized.

Readout Processing of Stored Data

The data transfer processing described above is processing used to transfer data between the microprocessors 211 and the communication interfaces 213. The data to be transferred mainly includes information items such as a data length and an address required when the data is transferred between the data buffer 214 and the cache memory 230. However, the data transfer processing described above is also applicable to processing to transfer data between the data buffer 214 and the cache memory 230.

Description will now be given of processing to transfer data between the data buffer 214 and the cache memory 230.

As described above, the channel controller 210 of the storage device controller 200 receives a data input/output request from the information processor 100, obtains information items such as an address and a data length for a storage volume 300 according to the data input/output request, and creates an I/O command to access the storage volume 300. When the data input/output request received by the channel controller 210 is, for example, a data read request, the channel controller 210 reads target data from the cache memory 230 and sends the data to the information processor 100.

The channel controller 210 stores data to be communicated with the information processor 100 in the data buffer 214. When the storage device controller 200 reads data from a storage volume 300, the data transfer LSI block 500 transfers data from the cache memory 230 to the data buffer 214. The communication interface 213 sends the data from the data buffer 214 to the information processor 100.

Figure 19:
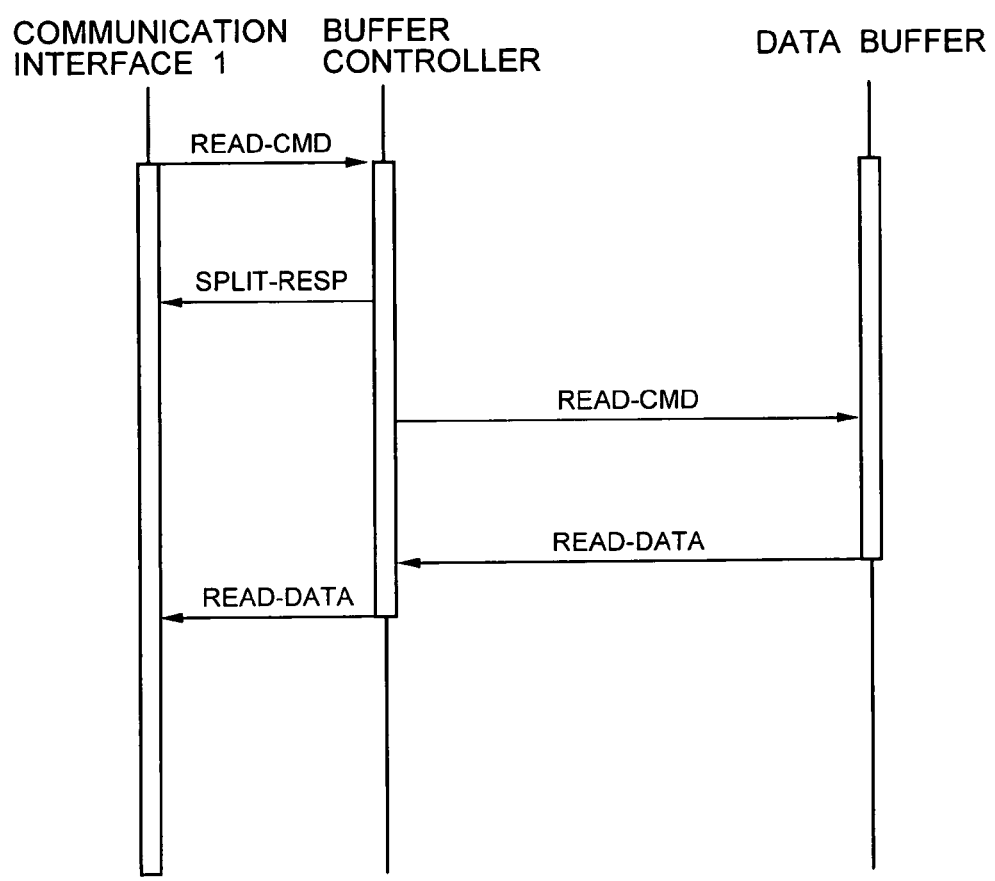
FIG. 19 is a flow diagram showing a flow of data transfer processing between a communication interface and a data buffer in the embodiment.

FIG. 19 shows a flow of processing for the communication interface 213 to read data via the buffer controller 505 from the data buffer 214.

The communication interface 213 obtains the right to use the bus 2103 and sends a read command (READ-CMD) to the buffer controller 505. The buffer controller 505 returns a split response thereto. Having received the split response, the communication interface 213 releases the right to use the bus 2103. The buffer controller 505 transfers the read command to the data buffer 214. According to the read command, the data buffer 214 sends data stored therein to the buffer controller 505. The buffer controller 505 obtains the right to use the bus 2103 and sends the data to the communication interface 213. The sequence of processing is almost the same as the data transfer processing shown in FIG. 3. That is, not only between the microprocessor 211 and the communication interface 213 but also between the communication interface 213 and the data buffer 214, it is possible in the data transfer processing to minimize the period of time in which the communication interface 213 and the bus 2103 are kept in the busy state. Therefore, the communication interface 213 can operate more efficiently and the bus 2103 can be more effectively used.

Figure 20:
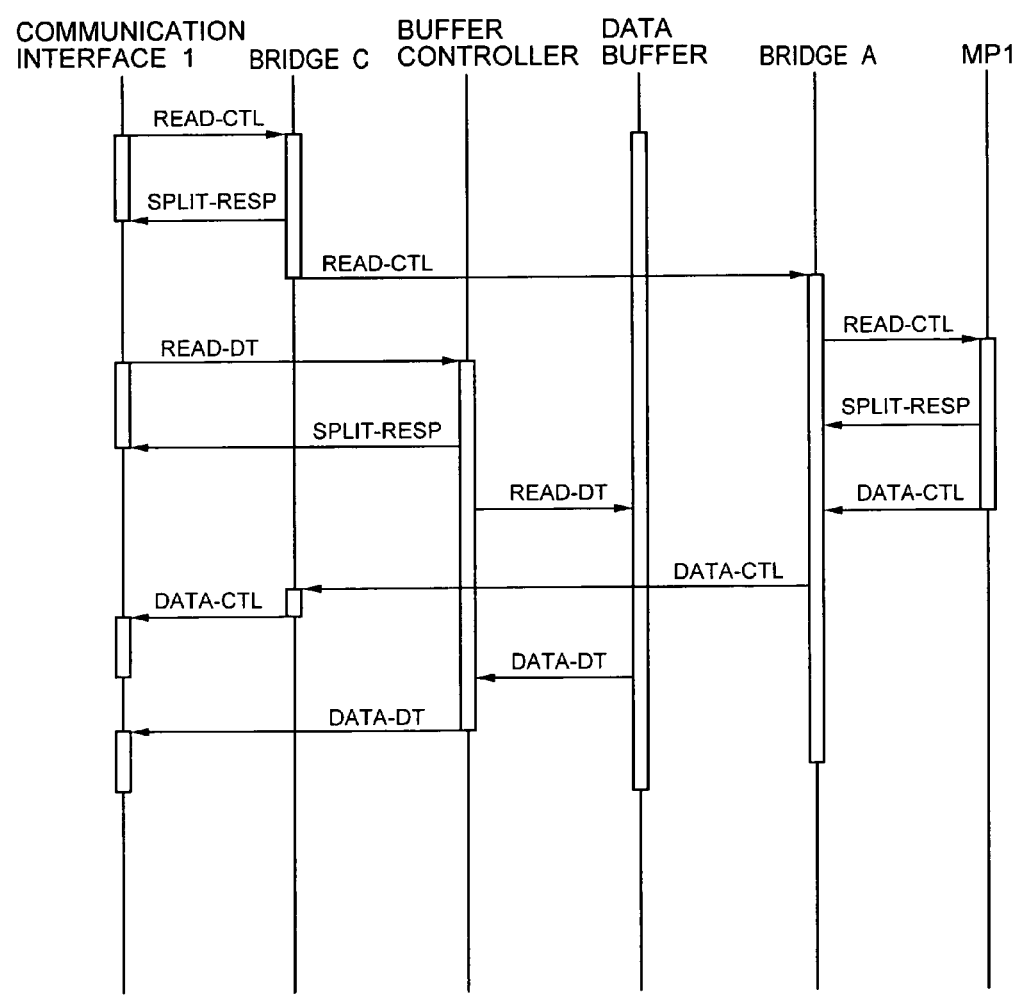
FIG. 20 is a flow diagram showing a flow of data transfer processing between a communication interface and a data buffer in the embodiment.

FIG. 20 shows a flow of processing in which to send data to the information processor 100, the communication interface 1 (213) obtains from the microprocessor 1 (211) information (data transfer information) necessary to transfer data and then obtains from the data buffer 214 data to be sent to the information processor 100.

The communication interface 1 (213) obtains the right to use the bus 2103 and sends a read command 1 (READ-CTL) to bridge C 503 to read the data transfer information from the microprocessor 1 (211). Having received the read command 1, bridge C 503 returns a split response to the communication interface 1 (213).

When the split response is received, the communication interface 1 (213) releases the right to use the bus 2103. The communication interface 1 (213) then obtains the right to use the bus 2103 and sends a read command to the buffer controller 505 to read data from the data buffer 214. Having received the data read command, the buffer controller 505 returns a split response to the communication interface 1 (213). When the split response is received, the communication interface 1 (213) releases the right to use the bus 2103.

By this point of time, the communication interface 1 (213) has transmitted the read command to the microprocessor 1 (211) and the data read command to the data buffer 214.

On the other hand, bridge C 503 transfers the read command 1 received from the communication interface 1 (213) to bridge A 501. Bridge A 501 transfers the read command 1 to the microprocessor 1 (211). Having received the read command 1, the microprocessor 1 (211) creates read data 1 according to the read command 1. After having created the read data 1, the microprocessor 1 (211) sends the read data to bridge A 501. When the read data is received, bridge A 501 transfers the read data to bridge C 503. Bridge C 503 obtains the right to use the bus 2103, sends the read data to the communication interface 1 (213), and releases the right to use the bus 2103.

The buffer controller 505 transfers the data read command to the data buffer 214. The data buffer 214 receives the data read command and sends data therefrom as readout data to the buffer controller 505 according to the read data command. The buffer controller 505 obtains the right to use the bus 2103, sends the readout data to the communication interface 1 (213), and releases the right to use the bus 2103.

Description has been given of the embodiment of the storage device controller 200. However, the data transfer processing described above is also applicable to other than the channel controller 210. The data transfer processing may also applies to, for example, a case in which the disk controller 240 includes an interface to conduct communication between a microprocessor and the cache memory 230 and a data transfer LSI block to transfer data between the cache memory 230 and the storage device 300 and the data transfer LSI block includes a plurality of bridges. In this configuration, the data transfer processing is applied to data transfer operations between the microprocessor and the interface.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A storage device control apparatus, comprising:
   a channel controller which receives a data input/output request sent from an information processor to a storage device;
   a disk controller which controls data input/output operations for the storage device; and
   a cache memory which stores input/output data communicated between the channel controller and the disk controller, wherein
   the channel controller comprises:
   a communication interface unit which communicates with the information processor;
   a data transfer unit connected via a first bus to the communication interface unit for transferring the input/output data communicated between the communication interface unit and the cache memory; and
   a processor connected via a second bus to the data transfer unit for controlling the data transfer unit;
   the communication interface unit transmits a read command to the data transfer unit, the read command indicating the processor to read data;
   the data transfer unit sends, when the first bus conforms to a first communication protocol, a split response to the communication interface unit and sends the read command to the processor, the split response indicating that readout data corresponding to the read command is transmitted later;
   the data transfer unit does not send, when the first bus conforms to a second communication protocol, the split response to the communication interface unit and sends the read command to the processor;
   the processor receives the read command, transmits the split response to the data transfer unit, and sends the readout data corresponding to the read command to the data transfer unit; and
   the data transfer unit receives the readout data and sends the readout data to the communication interface unit.

2. A storage device control apparatus according to claim 1, wherein:
   the first communication protocol is a PCI-X standard; and
   the second communication protocol is a PCI standard.

3. A storage device control apparatus according to claim 1, wherein:
   the data transfer unit includes a communication protocol setting unit which sets information indicating whether the communication protocol to which the first bus conforms is the first communication protocol or the second communication protocol; and
   the data transfer unit determines whether or not the split response is sent to the communication interface unit according to the information set to the communication protocol setting unit.

4. A storage device control apparatus according to claim 1, wherein:
   the processor sends the read command to the data transfer unit, the read command accessing the communication interface unit;
   the data transfer unit receive the read command, sends the split response to the processor, and sends the read command to the communication interface unit;
   the communication interface unit sends the readout data corresponding to the read command to the data transfer unit; and
   the data transfer unit receives the readout data and sends the readout data to the processor.

5. A storage device control apparatus according to claim 4, wherein:
   the processor obtains a right to use the first bus and then sends the read command to the data transfer unit;
   the processor receives the split response and releases the right to use the first bus; and
   the data transfer unit obtains a right to use the first bus, sends the readout data to the processor, and then releases the right to use the first bus.

6. A storage device control apparatus according to claim 1, wherein:
   the channel controller includes a plurality of said communication interface units;
   a first communication interface unit selected from the communication interface units is connected via the first bus to the data transfer unit;
   the channel controller includes a third bus for connecting a second communication interface unit selected from the communication interface units to the data transfer unit;
   the processor sends a first read command to the data transfer unit, the first read command accessing the first communication interface unit;
   the data transfer unit receives the first read command, sends the split response to the processor, and sends the first read command to the first communication interface unit;
   the processor sends a second read command to the data transfer unit, the second read command accessing the second communication interface unit;

the data transfer unit receives the second read command, sends the split response to the processor, and sends the second read command to the second communication interface unit;

the first communication interface unit sends first readout data corresponding to the first read command to the data transfer unit;

the data transfer unit receives the first readout data and sends the first readout data to the processor;

the second communication interface unit sends second readout data corresponding to the second read command to the data transfer unit; and the data transfer unit receives the second readout data and sends the second readout data to the processor.

7. A storage device control apparatus according to claim 1, wherein:

the channel controller includes a plurality of said communication interface units;

a first communication interface unit selected from the communication interface units is connected via the first bus to the data transfer unit;

the channel controller includes a third bus for connecting a second communication interface unit selected from the communication interface units to the data transfer unit;

the data transfer unit includes:

a first bus interface unit connected to the first bus for communicating data with the first communication interface unit;

a second bus interface unit connected to the second bus which communicates data with the processor; and a third bus interface unit connected to the third bus for communicating data with the second communication interface unit;

the processor sends a first read command to the data transfer unit, the first read command accessing the first communication interface unit;

the second bus interface unit receives the first read command, sends the first read command to the first bus interface unit, and sends the split response to the first bus interface unit;

the first bus interface unit sends the first read command to the first communication interface unit;

the processor sends a second read command to the data transfer unit, the second read command accessing the second communication interface unit;

the second bus interface unit receives the second read command, sends the second read command to the third bus interface unit, and sends the split response to the processor;

the third bus interface unit sends the second read command to the second communication interface unit;

the first communication interface unit sends a first readout command corresponding to the first read command to the data transfer unit;

the first bus interface unit receives the first readout data, sends the first readout data to the second bus interface unit, and the second bus interface unit sends the first readout data to the processor;

the second communication interface unit sends a second readout data corresponding to the second read command to the data transfer unit; and the third bus interface unit receives the second readout data, sends the second readout data to the second bus interface unit, and the second bus interface unit sends the second readout data to the processor.

8. A storage device control apparatus according to claim 1, wherein:

the channel controller includes a plurality of said processors;

a first processor selected from the processors sends a first read command to the data transfer unit, the first read command accessing the communication interface unit;

a second processor selected from the processors sends a second read command to the data transfer unit, the second read command accessing the communication interface unit;

the data transfer unit receives the first and second read commands, sends the split response to the first and second processors, and sends the first read command to the communication interface unit;

the communication interface unit sends first readout data corresponding to the first read command to the data transfer unit;

the data transfer unit sends the first readout data to the first processor;

the communication interface unit sends second readout data corresponding to the second read command to the data transfer unit; and the data transfer unit sends the second readout data to the second processor.

9. A storage device control apparatus according to claim 8, wherein the data transfer unit receives the first and second read commands and sends one of the first and second read commands which arrives first at the data transfer unit to the communication interface unit.

10. A storage device control apparatus according to claim 1, wherein:

the channel controller includes a plurality of said communication interface units and a plurality of said processors;

the channel controller includes:

a first bus for connecting a first communication interface unit selected from the communication interface units to the data transfer unit;

a second bus for connecting a first processor selected from the processors to the data transfer unit;

a third bus for connecting a second communication interface unit selected from the communication interface units to the data transfer unit; and a fourth bus for connecting a second processor selected from the processors to the data transfer unit;

the data transfer unit includes:

a first bus bridge connected to the first bus for communicating data with the first communication interface unit;

a second bus bridge connected to the second bus for communicating data with the first processor;

a third bus bridge connected to the third bus for communicating data with the second communication interface unit;

a fourth bus bridge connected to the fourth bus for communicating data with the second processor;

the second bus bridge is connected to the first and third bus bridges; and the fourth bus bridge is connected to the first and third bus bridges.

11. A storage device control apparatus according to claim 10, wherein:

the first processor obtains a right to use the second bus and sends a first read command to the data transfer unit, the first read command indicating a data read operation to the first communication interface unit;

the second bus bridge receives the first read command, sends a first split response to the first processor, and transfers the first read command to the first bus bridge;

the first processor receives the first split response and releases the right to use the second bus;

the first bus bridge receives the first read command and sends the first read command to the first communication interface unit;

the first processor obtains a right to use the first bus and sends a second read command to the data transfer unit, the second read command accessing the second communication interface unit;

the second bus bridge receives the second read command, sends a second split response to the first processor, and transfers the second read command to the third bus bridge;

the first processor receives the second split response and releases the right to use the first bus;

the first communication interface unit sends first readout data corresponding to the first read command to the data transfer unit;

the first bus bridge receives the first readout data and transfers the first readout data to the second bus bridge;

the second bus bridge obtains a right to use the first bus, sends the first readout data to the first processor, and releases the right to use the first bus;

the second communication interface unit sends second readout data corresponding to the second read command to the data transfer unit;

the third bus bridge receives the second readout data and transfers the second readout data to the second bus bridge; and the second bus bridge obtains a right to use the first bus and sends the second readout data to the first processor.

12. A storage device control apparatus according to claim 10, wherein:

the first processor sends a first read command to the data transfer unit, the first read command accessing the first communication interface unit;

the second processor sends a second read command to the data transfer unit, the second read command accessing the first communication interface unit;

the second bus bridge receives the first read command, transfers the first read command to the first bus bridge, and sends the split response to the first processor;

the first bus bridge receives the second read command and sends the second read command to the first communication interface unit;

the fourth bus bridge receives the second read command, transfers the second read command to the first bus bridge, and sends the split response to the second processor;

the first bus bridge receives the second read command;

the first bus bridge receives first readout data corresponding to the first read command from the first communication interface unit and transfers the first readout data to the second bus bridge;

the first bus bridge sends the second readout data to the first communication interface unit;

the second bus bridge receives the first readout data and sends the first readout data to the first processor;

the first bus bridge receives second readout data corresponding to the second read command from the first communication interface unit and sends the second readout data to the fourth bus bridge; and the fourth bus bridge sends the second readout data to the second processor.

13. A control method of controlling a storage device control apparatus, the storage device control apparatus comprising:

a channel controller for receiving a data input/output request sent from an information processor to a storage device;

a disk controller for controlling data input/output operations for the storage device; and a cache memory for storing input/output data communicated between the channel controller and the disk controller, wherein the channel controller comprises:

a communication interface unit for communicating with the information processor;

a data transfer unit connected via a first bus to the communication interface unit for transferring the input/output data communicated between the communication interface unit and the cache memory; and a processor connected via a second bus to the data transfer unit for controlling the data transfer unit, the control method comprising the steps of:

transmitting by the communication interface unit a read command to the data transfer unit, the read command indicating the processor to read data;

sending by the data transfer unit, when the first bus conforms to a first communication protocol, a split response to the communication interface unit and sending the read command to the processor, the split response indicating that readout data corresponding to the read command is transmitted later;

not sending by the data transfer unit, when the first bus conforms to a second communication protocol, the split response to the communication interface unit and sending the read command to the processor;

receiving by the processor the read command, transmits the split response to the data transfer unit, and sending the readout data corresponding to the read command to the data transfer unit; and receiving by the data transfer unit the readout data and sending the readout data to the communication interface unit.

14. A control method of controlling a storage device control apparatus according to claim 13, comprising the steps of:

sending by the processor the read command to the data transfer unit, the read command accessing the communication interface unit;

receiving by the data transfer unit the read command, sending the split response to the processor, and sending the read command to the communication interface unit;

sending by the communication interface unit the readout data corresponding to the read command to the data transfer unit; and receiving the data transfer unit the readout data and sending the readout data to the processor.

15. A control method of controlling a storage device control apparatus according to claim 13, wherein:

the channel controller includes a plurality of said communication interface units;

a first communication interface unit selected from the communication interface units is connected via the first bus to the data transfer unit; and the channel controller includes a third bus for connecting a second communication interface unit selected from the communication interface units to the data transfer unit, the control method comprising the steps of:

sending by the processor a first read command to the data transfer unit, the first read command accessing the first communication interface unit;

receiving by the data transfer unit the first read command, sending the split response to the processor, and sending the first read command to the first communication interface unit;

sending by the processor a second read command to the data transfer unit, the second read command accessing the second communication interface unit;

receiving by the data transfer unit the second read command, sending the split response to the processor, and sending the second read command to the second communication interface unit;

sending by the first communication interface unit first readout data corresponding to the first read command to the data transfer unit;

receiving by the data transfer unit the first readout data and sending the first readout data to the processor;

sending by the second communication interface unit second readout data corresponding to the second read command to the data transfer unit; and receiving the data transfer unit the second readout data and sending the second readout data to the processor.

16. A control method of controlling a storage device control apparatus according to claim 13, wherein:

the channel controller includes a plurality of said communication interface units;

a first communication interface unit selected from the communication interface units is connected via the first bus to the data transfer unit;

the channel controller includes a third bus for connecting a second communication interface unit selected from the communication interface units to the data transfer unit;

the data transfer unit includes:

a first bus interface unit connected to the first bus for communicating data with the first communication interface unit;

a second bus interface unit connected to the second bus for communicating data with the processor; and a third bus interface unit connected to the third bus for communicating data with the second communication interface unit, the control method comprising the steps of:

sending by the processor a first read command to the data transfer unit, the first read command accessing the first communication interface unit;

receiving by the second bus interface unit the first read command, sending the first read command to the first bus interface unit, and sending the split response to the first bus interface unit;

sending by the first bus interface unit the first read command to the first communication interface unit;

sending by the processor a second read command to the data transfer unit, the second read command accessing the second communication interface unit;

receiving by the second bus interface unit the second read command, sending the second read command to the third bus interface unit, and sending the split response to the processor;

sending by the third bus interface unit the second read command to the second communication interface unit;

sending by the first communication interface unit a first readout command corresponding to the first read command to the data transfer unit;

receiving by the first bus interface unit the first readout data, sending the first readout data to the second bus interface unit, and sending by the second bus interface unit the first readout data to the processor;

sending by the second communication interface unit a second readout data corresponding to the second read command to the data transfer unit; and receiving by the third bus interface unit the second readout data, sending the second readout data to the second bus interface unit, and sending by the second bus interface unit the second readout data to the processor.

17. A control method of controlling a storage device control apparatus according to claim 13, wherein the channel controller includes a plurality of said processors, the control method, the control method comprising the steps of:

sending by a first processor selected from the processors a first read command to the data transfer unit, the first read command accessing the communication interface unit;

sending by a second processor selected from the processors a second read command to the data transfer unit, the second read command accessing the communication interface unit;

receiving by the data transfer unit the first and second read commands, sending the split response to the first and second processors, and sending the first read command to the communication interface unit;

sending by the communication interface unit first readout data corresponding to the first read command to the data transfer unit;

sending by the data transfer unit the first readout data to the first processor;

sending by the communication interface unit second readout data corresponding to the second read command to the data transfer unit; and sending by the data transfer unit the second readout data to the second processor.

18. A control method of controlling a storage device control apparatus according to claim 17, comprising the steps of receiving by the data transfer unit the first and second read commands and sending one of the first and second commands which arrives first at the data transfer unit to the communication interface unit.

19. A control method of controlling a storage device control apparatus according to claim 13, wherein:

the channel controller includes a plurality of said communication interface units and a plurality of said processors;

the channel controller includes:

a first bus which connects a first communication interface unit selected from the communication interface units to the data transfer unit;

a second bus which connects a first processor selected from the processors to the data transfer unit;

a third bus which connects a second communication interface unit selected from the communication interface units to the data transfer unit; and a fourth bus which connects a second processor selected from the processors to the data transfer unit;

the data transfer unit includes:

a first bus bridge connected to the first bus for communicating data with the first communication interface unit;

a second bus bridge connected to the second bus for communicating data with the first processor;

a third bus bridge connected to the third bus for communicating data with the second communication interface unit;

a fourth bus bridge connected to the fourth bus for communicating data with the second processor;

the second bus bridge is connected to the first and third bus bridges; and the fourth bus bridge is connected to the first and third bus bridges, the control method comprising the steps of:

obtaining by the first processor a right to use the second bus and sending a first read command to the data transfer unit, the first read command indicating a data read operation to the first communication interface unit;

receiving by the second bus bridge the first read command, sending a first split response to the first processor, and transferring the first read command to the first bus bridge;

receiving by the first processor the first split response and releasing the right to use the first bus;

receiving by the first bus bridge the first read command and sending the first read command to the first communication interface unit;

obtaining by the first processor a right to use the first bus and sending a second read command to the data transfer unit, the second read command accessing the second communication interface unit;

receiving by the second bus bridge the second read command, sending a second split response to the first processor, and transferring the second read command to the third bus bridge;

receiving by the first processor the second split response and releasing the right to use the first bus;

sending by the first communication interface unit first readout data corresponding to the first read command to the data transfer unit;

receiving by the first bus bridge the first readout data and transferring the first readout data to the second bus bridge;

obtaining by the second bus bridge a right to use the first bus, sending the first readout data to the first processor, and releasing the right to use the first bus;

sending by the second communication interface unit second readout data corresponding to the second read command to the data transfer unit;

receiving by the third bus bridge the second readout data and transferring the second readout data to the second bus bridge; and obtaining by the second bus bridge a right to use the first bus and sending the second readout data to the first processor.

20. A control method of controlling a storage device control apparatus according to claim 13, wherein:

the channel controller includes a plurality of said communication interface units and a plurality of said processors;

the channel controller includes:

a first bus for connecting a first communication interface unit selected from the communication interface units to the data transfer unit;

a second bus for connecting a first processor selected from the processors to the data transfer unit;

a third bus for connecting a second communication interface unit selected from the communication interface units to the data transfer unit; and a fourth bus for connecting a second processor selected from the processors to the data transfer unit;

the data transfer unit includes:

a first bus bridge connected to the first bus for communicating data with the first communication interface unit;

a second bus bridge connected to the second bus for communicating data with the first processor;

a third bus bridge connected to the third bus for communicating data with the second communication interface unit;

a fourth bus bridge connected to the fourth bus for communicating data with the second processor;

the second bus bridge is connected to the first and third bus bridges; and the fourth bus bridge is connected to the first and third bus bridges, the control method comprising the steps of:

sending by the first processor a first read command to the data transfer unit, the first read command accessing the first communication interface unit;

sending by the second processor a second read command to the data transfer unit, the second read command accessing the first communication interface unit;

receiving by the second bus bridge the first read command, transferring the first read command to the first bus bridge, and sending the split response to the first processor;

receiving by the first bus bridge the second read command and sending the second read command to the first communication interface unit;

receiving by the fourth bus bridge the second read command, transferring the second read command to the first bus bridge, and sending the split response to the second processor;

receiving by the first bus bridge the second read command;

receiving by the first bus bridge first readout data corresponding to the first read command from the first communication interface unit and transferring the first readout data to the second bus bridge;

sending by the first bus bridge the second readout data to the first communication interface unit;

receiving by the second bus bridge the first readout data and sending the first readout data to the first processor;

receiving by the first bus bridge second readout data corresponding to the second read command from the first communication interface unit and sending the second readout data to the fourth bus bridge; and sending by the fourth bus bridge the second readout data to the second processor.

* * * * *